US011380096B2

(12) United States Patent
Kim et al.

(10) Patent No.: US 11,380,096 B2
(45) Date of Patent: Jul. 5, 2022

(54) ELECTRONIC DEVICE FOR PERFORMING IMAGE PROCESSING AND METHOD THEREOF

(71) Applicant: Samsung Electronics Co., Ltd., Gyeonggi-do (KR)

(72) Inventors: Sungoh Kim, Gyeonggi-do (KR); Youngjo Kim, Gyeonggi-do (KR); Jiyoon Park, Gyeonggi-do (KR); Hyunhee Park, Gyeonggi-do (KR); Hyungju Chun, Gyeonggi-do (KR); Jongbum Choi, Gyeonggi-do (KR); Changsu Han, Gyeonggi-do (KR); Jonghun Won, Gyeonggi-do (KR); Arang Lee, Gyeonggi-do (KR); Sungjun Lim, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 274 days.

(21) Appl. No.: 16/841,741

(22) Filed: Apr. 7, 2020

(65) Prior Publication Data
US 2020/0320298 A1 Oct. 8, 2020

(30) Foreign Application Priority Data

Apr. 8, 2019 (KR) .................... 10-2019-0040697

(51) Int. Cl.
*G06V 20/20* (2022.01)
*G06T 3/40* (2006.01)
(Continued)

(52) U.S. Cl.
CPC .............. *G06V 20/20* (2022.01); *G06T 3/40* (2013.01); *G06V 10/98* (2022.01); (Continued)

(58) Field of Classification Search
CPC ........ G06V 20/20; G06V 10/98; G06V 10/17; G06V 10/235; G06V 10/255;
(Continued)

(56) References Cited

U.S. PATENT DOCUMENTS 8,081,227 B1 12/2011 Kim et al.
9,311,735 B1 * 4/2016 Amirghodsi ............ G06T 5/005
(Continued)

FOREIGN PATENT DOCUMENTS

JP 2016-187176 A 10/2016
KR 10-2016-0092136 A 8/2016
(Continued)

OTHER PUBLICATIONS

International Search Report dated Jul. 20, 2020.

*Primary Examiner* — Michael S Osinski
(74) *Attorney, Agent, or Firm* — Cha & Reiter, LLC

(57) ABSTRACT

In accordance with an aspect of the disclosure, an electronic device comprises a communication circuit; a display; at least one processor operatively connected to the display and the communication circuit; and a memory operatively connected to the at least one processor, wherein the memory stores instructions that, when executed, cause the at least one processor to perform a plurality of operations comprising: storing first raw image data in the memory; generating first small raw image data smaller in size than the first raw image data, from the first raw image data; transmitting the first small raw image data to a first external electronic device via the communication circuit; receiving information about an object region for identifying at least one object of the first small raw image data from the first external electronic device via the communication circuit; transmitting a first region of the first raw image data to a second external electronic device via the communication circuit based on a user input and the information about the object region;
(Continued)

displaying first display image data corresponding to the information about the object region via the display; and identifying the user input associated with selection of the object region.

17 Claims, 18 Drawing Sheets

(51) Int. Cl.
    *H04N 7/08*     (2006.01)
    *H04N 5/232*     (2006.01)
    *H04N 5/765*     (2006.01)
    *H04N 5/917*     (2006.01)
    *G06V 10/98*     (2022.01)

(52) U.S. Cl.
    CPC ... *H04N 5/23229* (2013.01); *H04N 5/232933* (2018.08); *H04N 5/765* (2013.01); *H04N 5/917* (2013.01); *H04N 7/0806* (2013.01)

(58) Field of Classification Search
    CPC ............ G06V 2201/10; G06V 40/166; G06V 40/172; G06V 40/174; G06T 3/40; G06T 1/20; G06T 1/60; G06T 9/00; H04N 5/23229; H04N 5/232933; H04N 5/765; H04N 5/917; H04N 7/0806; H04N 5/772; H04N 9/8042; H04N 9/8205; H04N 21/436; H04N 21/222; G06K 9/6253; G06F 3/04845; G06F 3/0488; G06F 3/04842; G06F 3/04883; G06F 16/434; G06F 16/532; G06F 16/58
    See application file for complete search history.

(56) References Cited

U.S. PATENT DOCUMENTS

| | | | |
|---|---|---|---|
| 10,032,301 | B2 | 7/2018 | Balasubramanian et al. |
| 10,032,302 | B2 | 7/2018 | Balasubramanian et al. |
| 10,741,020 | B1* | 8/2020 | Thoeni ................ G07F 17/3288 |
| 2013/0170738 | A1* | 7/2013 | Capuozzo .............. G06V 20/70 382/226 |
| 2014/0080419 | A1* | 3/2014 | Ko .......................... H04W 4/21 455/41.3 |
| 2014/0172831 | A1* | 6/2014 | Jin ........................ G06F 16/248 707/722 |
| 2015/0051922 | A1* | 2/2015 | Rentas .................... G16H 10/40 705/2 |
| 2015/0161755 | A1 | 6/2015 | Jang |
| 2015/0199121 | A1* | 7/2015 | Gulaka ................ A61B 6/5229 715/771 |
| 2016/0073034 | A1* | 3/2016 | Mukherjee ....... H04N 5/232935 348/333.11 |
| 2016/0217590 | A1* | 7/2016 | Mullins ..................... G06T 7/40 |
| 2016/0219126 | A1 | 7/2016 | Oh et al. |
| 2016/0261906 | A1 | 9/2016 | Jang |
| 2017/0364729 | A1* | 12/2017 | Kagaya ................... G06T 7/174 |
| 2018/0046261 | A1* | 2/2018 | Ishimoto ............... G06F 3/1462 |
| 2018/0101971 | A1 | 4/2018 | Balasubramanian et al. |
| 2018/0276473 | A1* | 9/2018 | Kim ...................... G06V 10/255 |
| 2018/0332439 | A1* | 11/2018 | Woo ..................... G11B 27/034 |
| 2018/0336666 | A1 | 11/2018 | Kim et al. |
| 2019/0042079 | A1* | 2/2019 | Choi .................... G06F 3/04845 |
| 2019/0042574 | A1* | 2/2019 | Kim ...................... G06F 16/434 |
| 2019/0122046 | A1* | 4/2019 | Wantland ............... G06N 20/00 |
| 2019/0279345 | A1 | 9/2019 | Kim et al. |
| 2020/0007599 | A1* | 1/2020 | Segerby ................. G06Q 50/18 |
| 2020/0104034 | A1* | 4/2020 | Lee ..................... G06F 3/04845 |
| 2020/0143593 | A1* | 5/2020 | Rudman ................ G06T 19/006 |
| 2020/0145609 | A1* | 5/2020 | Ahn ................. H04N 21/44218 |
| 2020/0252667 | A1* | 8/2020 | Li ..................... H04N 21/44224 |
| 2021/0092479 | A1* | 3/2021 | Namba .................. G06V 20/41 |
| 2021/0117651 | A1* | 4/2021 | Kotake .................... G06T 7/00 |
| 2021/0233272 | A1* | 7/2021 | Jiang ........................ G09G 5/12 |
| 2021/0241537 | A1* | 8/2021 | Ahn ........................ G06V 20/20 |
| 2021/0270625 | A1* | 9/2021 | Nilsson ................ G06V 20/584 |
| 2021/0272249 | A1* | 9/2021 | Han .................... H04N 5/23229 |

FOREIGN PATENT DOCUMENTS

| | | |
|---|---|---|
| KR | 10-2018-0051367 A | 5/2018 |
| KR | 10-2018-0127782 A | 11/2018 |

* cited by examiner

ELECTRONIC DEVICE FOR PERFORMING IMAGE PROCESSING AND METHOD THEREOF

CROSS-REFERENCE TO RELATED APPLICATION(S)

This application is based on and claims priority under 35 U.S.C. § 119 to Korean Patent Application No. 10-2019-0040697, filed on Apr. 8, 2019, in the Korean Intellectual Property Office, the disclosure of which is incorporated by reference herein its entirety.

BACKGROUND

1. Field

The disclosure relates to an electronic device and a method for performing image processing.

2. Description of Related Art

An electronic device may obtain raw image data through an image sensor. The electronic device may process the obtained raw image data, using an embedded image signal processor (ISP) (or a processor). The image signal processor (or the processor) may provide an image of improved image quality, by processing the received raw image using an image enhancement algorithm. The image signal processor (or the processor) may perform various processing such as white balance adjustment, color adjustment (e.g., color matrix, color correction, or color enhancement), color filter array interpolation, noise reduction processing or sharpening, or image enhancement (e.g., high-dynamic-range (HDR), face detection, or the like). Images output from the image signal processor (or the processor) may be compressed, and then the compressed image (e.g., an image in JPEG format) may be stored in the electronic device.

To provide a user with an image backup function and a new media content generation function, the electronic device may use the cloud system. The cloud system may process images by applying computer-based technology that is difficult to perform in the electronic device, such as a scheme of image matching, or the like.

The above information is presented as background information only to assist with an understanding of the disclosure. No determination has been made, and no assertion is made, as to whether any of the above might be applicable as prior art with regard to the disclosure.

SUMMARY

In accordance with an aspect of the disclosure, an electronic device comprises a communication circuit; a display; at least one processor operatively connected to the display and the communication circuit; and a memory operatively connected to the at least one processor, wherein the memory stores instructions that, when executed, cause the at least one processor to perform a plurality of operations comprising: storing first raw image data in the memory; generating first small raw image data smaller in size than the first raw image data, from the first raw image data; transmitting the first small raw image data to a first external electronic device via the communication circuit; receiving information about an object region for identifying at least one object of the first small raw image data from the first external electronic device via the communication circuit; transmitting a first region of the first raw image data to a second external electronic device via the communication circuit based on a user input and the information about the object region; displaying first display image data corresponding to the information about the object region via the display; and identifying the user input associated with selection of the object region.

In accordance with another aspect of the invention, an image processing method of an electronic device comprises storing first raw image data in a memory; generating first small raw image data smaller in size than the first raw image data, from the first raw image data; transmitting the first small raw image data to a first external electronic device; receiving information about an object region for identifying at least one object of the first small raw image data from the first external electronic device; transmitting a first region of the first raw image data to a second external electronic device based on a user input and the information about the object region; and displaying first display image data corresponding to the information about the object region via a display, wherein the user input is associated with selection of the object region.

In accordance with an aspect of the disclosure, an electronic device comprises a communication circuit; a display; at least one processor operatively connected to the communication circuit, and the display; and a memory operatively connected to the processor, wherein the memory stores instructions that, when executed, cause the at least one processor to perform a plurality of operations comprising: storing raw image data including first and second objects in the memory; transmitting first small raw image data including the first and second objects to a first external electronic device via the communication circuit; receiving information about first and second object regions generated based on the first small raw image data and for respectively identifying the first and second objects from the first external electronic device via the communication circuit to display the information about the first and second object regions via the display; identifying a user input associated with selection of the first object; transmitting a partial region of the raw image data, which includes the first object and does not include the second object, to a second external electronic device based on the user input; and displaying first display image data corresponding to the information about the first and second object regions via the display.

In accordance with another aspect of the disclosure, an electronic device may include a housing, a wireless communication circuit disposed inside the housing, a camera disposed inside the housing, exposed through a portion of the housing, and generating raw image data, a display disposed inside the housing, viewable through a portion of the housing, and displaying an image of a first display image data generated based on the raw image data, at least one processor operatively connected to the wireless communication circuit, the display, and the camera, and at least one memory operatively connected to the processor and storing the raw image data. The memory may store instructions that, when executed, cause the processor to generate first small raw image data smaller in size than the raw image data based on the raw image data, to transmit the first small raw image data to a server locally connected to a base station, using the wireless communication circuit, to receive first image data, which is generated based on the first small raw image data by the server and includes meta data associated with object recognition within the first small raw image data, using the wireless communication circuit, to generate second display image data, using the first display image data and the first image data, and to display an image of the second display image data on the display.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

An image processing scheme may be based on the performance of a hardware device such as ISP or performance of software such as algorithms. To use an advanced image processing scheme, an electronic device may need to be equipped with a new hardware device. The may result in an increase in chip prices, heat generation problems, as well as mounting space issues.

When a cloud system is used to process image data with computer-based technology that may be difficult to be performed by the electronic device, it may take some time to provide a user with an image backup function and new media content generation function.

Embodiments of this disclosure may reduce the time required to perform image processing by allowing the electronic device to transmit only a part of the raw image data to an external electronic device.

According to embodiments of this disclosure, the electronic device may reduce the time and transmission cost, which are required to perform image processing, by transmitting only the part of raw image data to an external electronic device such as a cloud server.

According to embodiments of this disclosure, an electronic device may quickly show the identified image data to a user, by using another external electronic device such as an edge server.

According to embodiments of this disclosure, the electronic device may transmit less data than the size of the image to an external electronic device such as an edge server, and thus may quickly show the image data, in which an object is identified, to the user.

Hereinafter, certain embodiments of the disclosure will be described with reference to accompanying drawings. However, those of ordinary skill in the art will recognize that modification, equivalent, and/or alternative on certain embodiments described herein can be variously made without departing from the scope and spirit of the disclosure.

Figure 1:
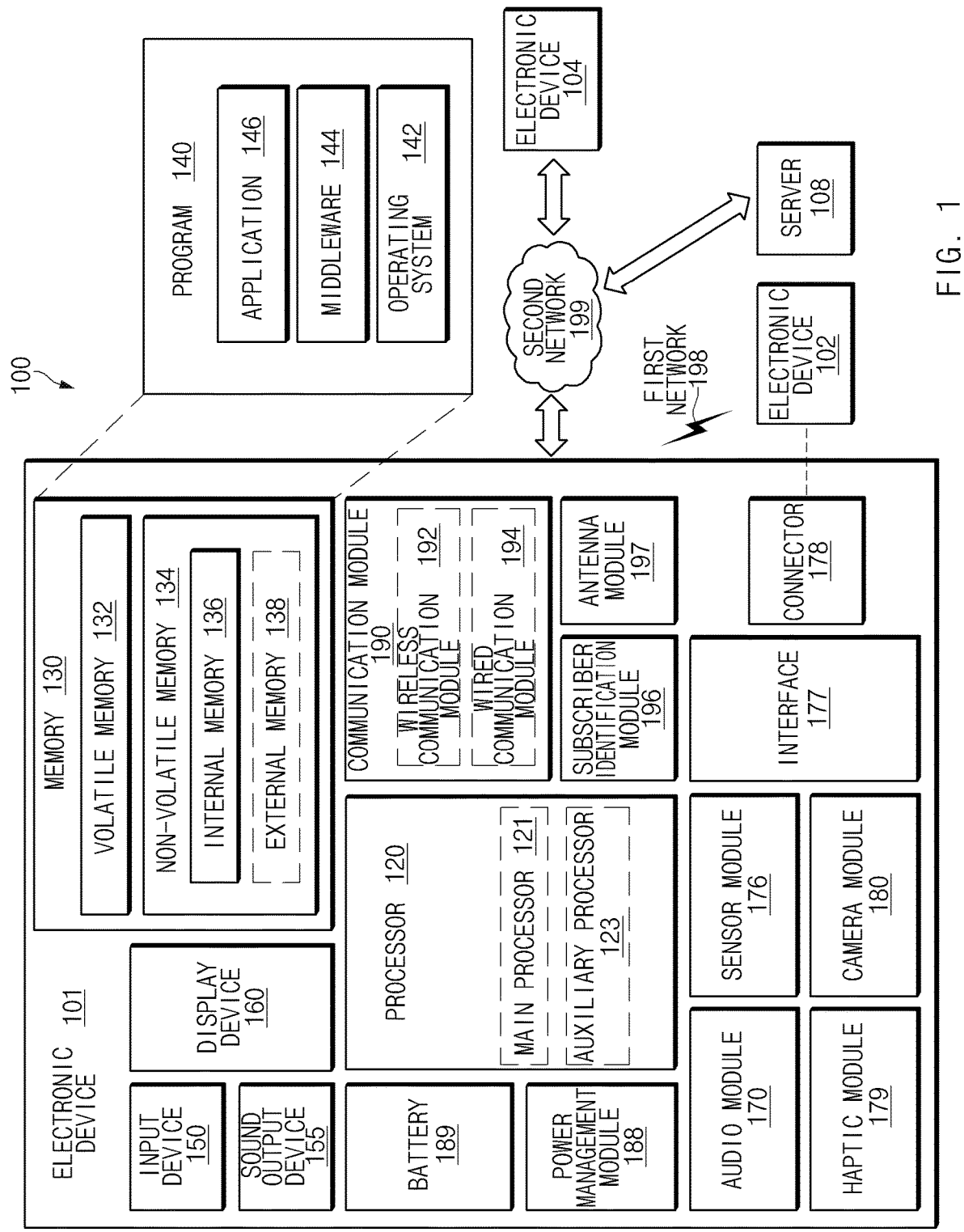
FIG. 1 is a block diagram illustrating an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
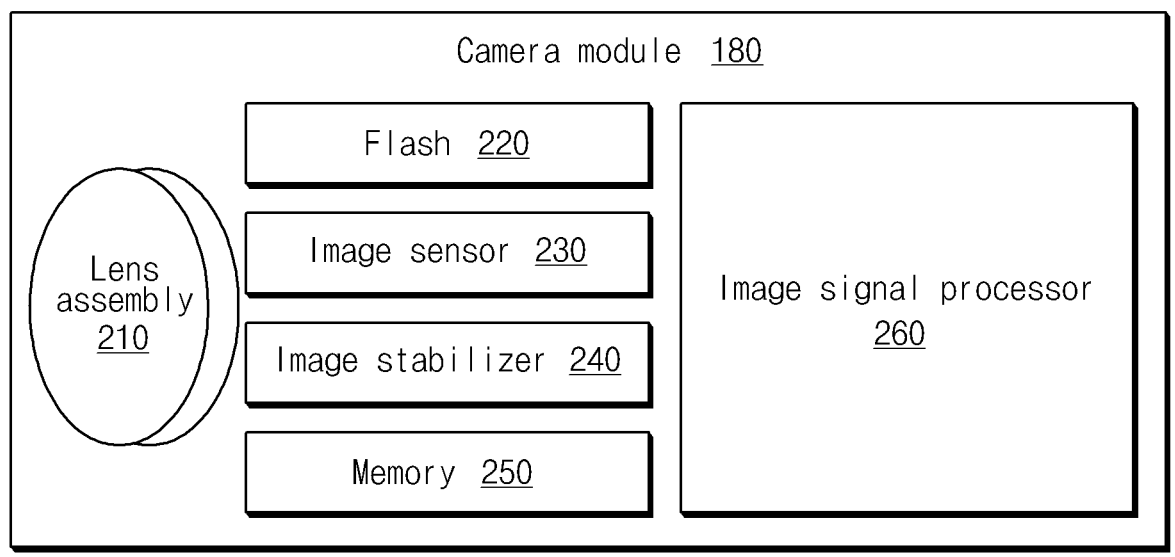
FIG. 2 is a block diagram illustrating the camera module according to certain embodiments.

FIG. 2 is a block diagram 200 illustrating the camera module 180 according to certain embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
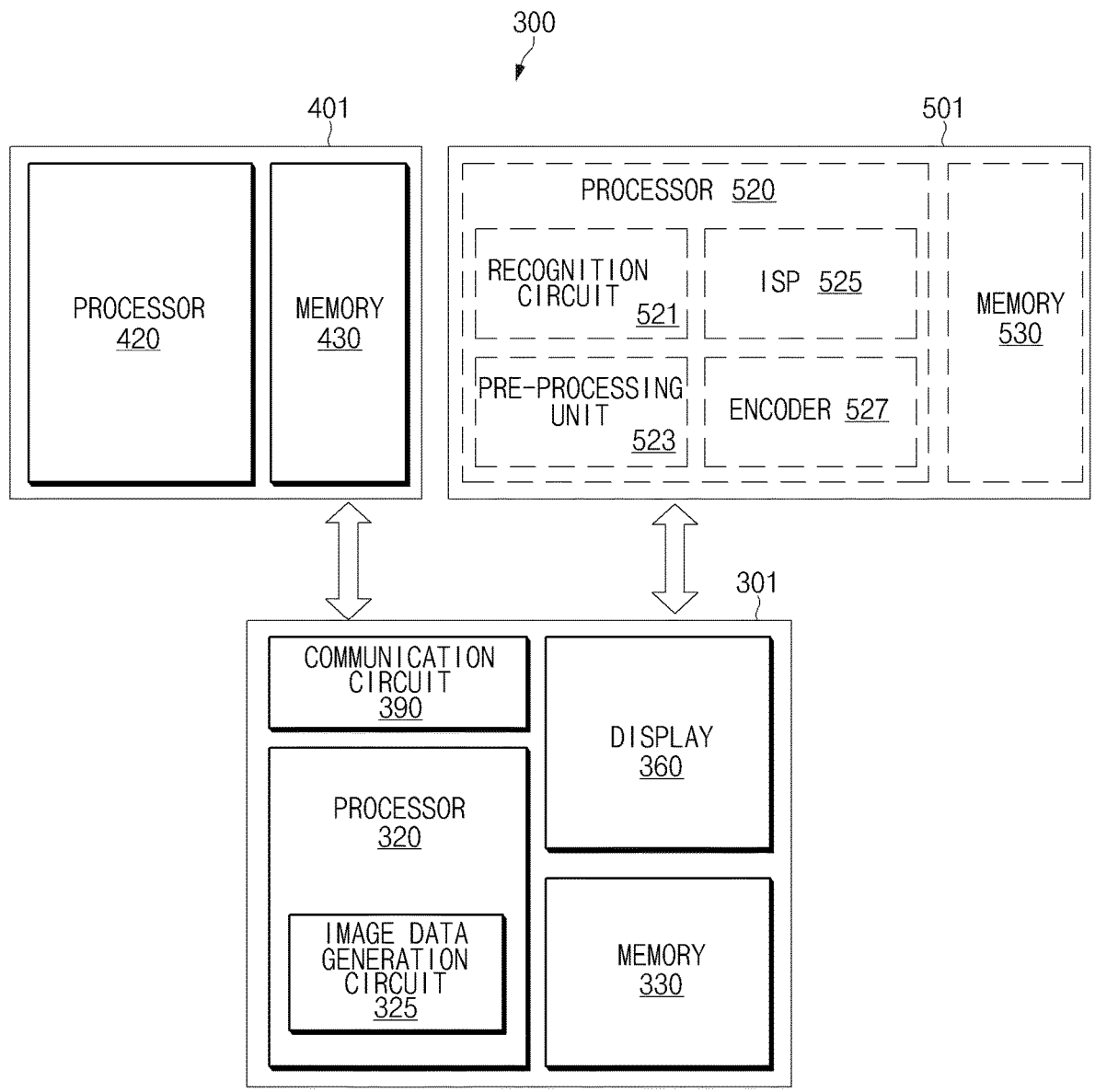
FIG. 3 is a block diagram of an electronic device, a first external electronic device, and a second external electronic device for performing image processing, using a first external electronic device and a second external electronic device, according to an embodiment of this disclosure.

FIG. 3 is a block diagram of an electronic device 301, a first external electronic device 401, and a second external electronic device 501 for performing image processing, using a first external electronic device 401 and a second external electronic device 501, according to an embodiment of this disclosure.

Referring to FIG. 3, a network environment 300 (e.g., the network environment 100 of FIG. 1) may include the electronic device 301 (e.g., the electronic device 101 of FIG. 1 or the camera module 180 of FIG. 2), the first external electronic device 401, and the second external electronic device 501. The first external electronic device 401 and the second external electronic device 501 may be devices that are physically separate and functionally different from each other.

According to an embodiment, the electronic device 301 may include, for example, a smartphone, a tablet PC, a wearable device, a home appliance, or a portable device such as a digital camera. The first external electronic device 401 may include an edge server. The edge server may be used to implement edge computing technology. For example, the edge computing technology may include multi-access edge computing (MEC) (or fog computing). For example, the edge computing technology may refer to a technology for providing data to the electronic device 301 via a separate server (hereafter, referred to as an "edge server") installed at a location geographically close to the electronic device 301 or a base station (e.g. inside or near a base station) serving the electronic device 301. For example, an application needing low latency among at least one application installed in the electronic device 301 may transmit and/or receive data via an edge server installed at a geographically close location. For another example, the edge computing technology may refer to a technology for providing data to the electronic device 301 via an edge server having a relatively low latency, as compared to another server.

The second external electronic device 501 may include a server (e.g., a cloud server).

The electronic device 301 may include a processor 320 (e.g., the processor 120 of FIG. 1 and/or the image signal processor 260 of FIG. 2), a memory 330 (e.g., the memory 130 of FIG. 1 and/or the memory 250 of FIG. 2), a display 360 (e.g., the display device 160 of FIG. 1), and/or a communication circuit 390 (e.g., the communication module 190 of FIG. 1). Hereinafter, the term "processor" shall be understood to include the singular and plural contexts.

According to an embodiment, the electronic device 301 may further include additional components in addition to the components illustrated in FIG. 3. For example, the electronic device 301 may further include at least one of an image sensor (e.g., the image sensor 230 of FIG. 2) obtaining raw image data, an input device (e.g., the input device 150 of FIG. 1) receiving a user input, a connection terminal (e.g., a USB connector) used to be physically connected to the first external electronic device 401, and a connection terminal (e.g., a USB connector) used to be physically connected to the second external electronic device 501.

The communication circuit 390 may process data transmitted to the first external electronic device 401 and/or the second external electronic device 501 or data received from the first external electronic device 401 and/or the second external electronic device 501.

The display 360 may be electrically connected to the processor 320. The display 360 may graphically output various information. For example, the display 360 may display image data. In an embodiment, the display 360 may be a touch screen display. When the display 360 is a touch screen display, a user input may be received via the display 360, via, for example, a graphical user interface.

The memory 330 may store commands, information, or data associated with operations of components included in the electronic device 301. For example, the memory 330 may store instructions, when executed, that cause the processor 320 to perform various operations described in this disclosure.

The processor 320 may be operatively coupled with the communication circuit 390, the memory 330, and the display 360 to perform the overall function of the electronic device 301. For example, the processor 320 may include one or more processors. For example, one or more processors may include an image signal processor (ISP), an application processor (AP), or a communication processor (CP).

The processor 320 may write raw image data obtained for at least one object via an image sensor (e.g., the image sensor 230 of FIG. 2), in the memory 330. For example, when a user captures a scene to generate raw image data, the processor 320 may store the generated raw image data in the memory 330. For example, the raw image data may include a picture or a still image included in video.

For example, in the raw image data, a pixel may be expressed as a single color of red, green, and blue (RGB) and may be expressed as 8 to 16 bit-depths. For example, the raw image data may be Bayer image data processed by a color filter array (CFA) pattern. For example, the raw image data may be raw image data of a layer structure capable of detecting three colors from a single pixel. For example, the raw image data may be raw image data of a dual pixel (DP) structure including different disparity information or phase difference information in a single pixel. For example, the raw image data may include two or more raw images obtained via two or more image sensors that are the same as or different from each other. For example, two or more image sensors may include a dual sensor (e.g., RGB+RGB, RGB+mono, or wide+tele), a triple sensor, or a quad sensor or may include an array sensor. For example, the raw image data may be meta data of an image. For example, the meta data of an image may include at least one of an image file identifier (ID), date of shooting, a shooting mode, an exposure mode, picture rotation, a metering mode, ISO information, an exposure time, a raw image format, an image size, a maximum aperture value, a focal length, white balance, or flash use.

The image data generation circuit 325 may generate small raw image data using raw image data. The small raw image data may be generated from raw image data. The size of the small raw image data may be smaller than the size of the raw image data. To generate small raw image data, the image data generation circuit 325 may perform at least one of down scaling, down sampling, decimation, or compression on the raw image data. For example, in certain embodiments, the small raw image data may include a thumbnail, or JPEG representation of the image data.

In certain embodiments, the image data generation circuit 325 may be formed as a circuit separate from the processor 320. Alternatively, in certain embodiments, the image data generation circuit 325 may be omitted; the function of the image data generation circuit 325 may be implemented by the processor 320. The image data generation circuit 325 may transmit the generated small raw image data to the first external electronic device 401 via the communication circuit 390.

The processor 320 may receive object region information for identifying at least one object of small raw image data from the first external electronic device 401 via the communication circuit 390.

The processor 320 may display the display image data corresponding to the object region information on the display 360. The display image data displayed by the processor 320 on the display 360 may include at least one of a category or a name of the identified at least one object. For example, the processor 320 may display at least one of a category or a name on at least one object identified from the raw image data based on the object region information and may provide the displayed result to a user via the display 360.

The processor 320 may transmit a partial region of raw image data to the second external electronic device 501 via the communication circuit 390 based on a user input and the object region information. For example, the user input may be associated with the selection of an object region. In certain embodiments, the user may make a touch input selecting an object region on a displayed image. The processor 320 may transmit a partial region of raw image data corresponding to the object region selected by the user input to the second external electronic device 501, may thereby avoiding transmission of the remaining raw image data (the portions of the raw image data that are not corresponding to the selected object region) to the second external electronic device 501.

The processor 320 may receive correction data of a partial region of the raw image data from the second external electronic device 501 via the communication circuit 390. The processor 320 may generate corrected image data by merging the correction data of the partial region of the raw image data and raw image data of the remaining regions other than the partial region.

For example, the first external electronic device 401 may include a processor 420 and a memory 430. The processor 420 may identify at least one object of small raw image data received from the electronic device 301 to provide object region information.

For example, the processor 420 may analyze the small raw image data to identify at least one object included in the small raw image data. For example, the processor 420 may identify at least one object by segmenting and recognizing at least one object included in the small raw image data. For example, the processor 420 may identify at least one object by determining an attribute of at least one object included in the small raw image data. For example, the processor 420 may identify whether at least one object is a person, an animal, or an object; furthermore, the processor 420 may identify a human body part (e.g., a face or a body), a kind of animal, or a kind of object from the identified at least one object. In certain embodiments, the processor 420 may search for certain objects that are commonly found in pictures (furniture, and items typically found in homes, etc.) or use a library of object information. For example, the processor 420 may identify a location (e.g., coordinate information) in the small raw image data (or screen) in which at least one object is positioned.

The processor 420 may identify at least one object to provide object region information. For example, the processor 420 may divide the region of small raw image data to correspond to the identified at least one object. For example, when the small raw image data includes a first object and the object region information includes information about the first object region corresponding to the first object, the processor 320 of the electronic device 301 may identify a partial region of raw image data corresponding to the first object region based on the object region information. The partial region of the identified raw image data may include the first object.

At least one of the object region information or the small raw image data may be stored in the memory 430.

The second external electronic device 501 may include a processor 520 and a memory 530. The second external electronic device 501 may further include at least one of additional components in addition to the components illustrated in FIG. 3. For example, the second external electronic device 501 may include a communication module or a connection terminal for communicating with the electronic device 301. According to an embodiment, the components of the second external electronic device 501 may be the same entities or may constitute separate entities.

The processor 520 may perform an overall function for processing some regions of raw image data received from the electronic device 301. For example, the second external electronic device 501 may include at least one the processor 520. The processor 520 may include a recognition circuit 521, a pre-processing unit 523, an encoder 527, and/or an ISP 525. The components included in the processor 520 may be controlled by a single processor or distributively implemented by a plurality of processors.

The processor 520 may generate correction data of some regions of raw image data.

For example, before delivering some regions of raw image data to the recognition circuit 521 or the ISP 525, the pre-processing unit 523 may perform at least one of decompression, image enhancement, de-mosaic processing, deblocking, edge sharpening, or image format change.

The recognition circuit 521 may perform an algorithm for analyzing information associated with some regions of raw image data. The recognition circuit 521 may be a logic circuit or may be implemented by the processor 520. For example, the recognition circuit 521 may analyze object recognition, face recognition, velocity vector, segmentation, or scene parsing. The recognition circuit 521 may generate structure information based on information associated with some regions of raw image data. For example, the structure information may include segments, layers, vectors, or scene categories. The recognition circuit 521 may transmit the structure information to the ISP 525.

The ISP 525 may perform image processing on some regions of raw image data, using the structure information received from the recognition circuit 521. For example, at least part of image processing performed by the ISP 525 may be different from the image processing performed by the processor 320 of the electronic device 301. For example, the type of the processor 320 of the electronic device 301 may be different from the type of the ISP 525.

For example, the ISP 525 may perform white balance adjustment, color adjustment, color filter array interpolation, sharpening, or image enhancement, using the structure information. According to an embodiment, the ISP 525 may perform image processing using additional information (e.g., feature vector) stored in the memory 530. For example, some regions of image-processed raw image data may have YUV format.

The encoder 527 may generate correction data (e.g., image files) of some regions by encoding some regions of raw image data. The image file (e.g., JPEG, MPEG, or 360-degree image) may include a file for a picture, video, or a still image of the video.

The memory 530 may refer to one or more memories for storing correction data of some regions of raw image data.

Figure 4:
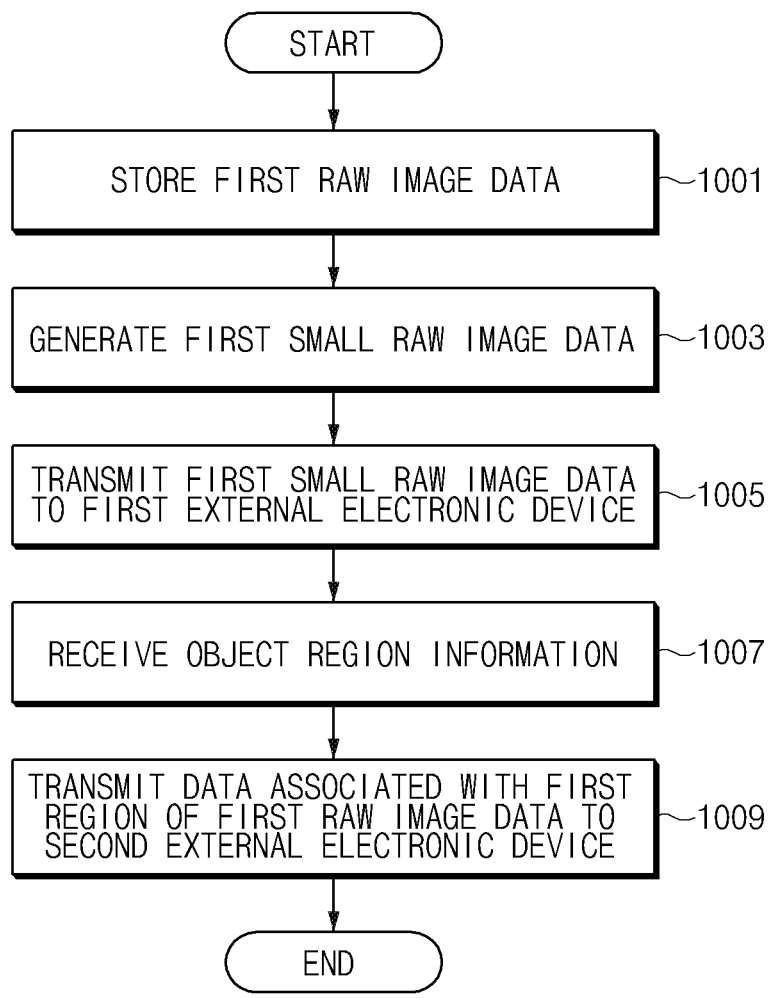
FIG. 4 is a flowchart for describing a method in which an electronic device performs image processing, according to an embodiment of this disclosure.

FIG. 4 is a flowchart for describing a method in which the electronic device 301 performs image processing, according to an embodiment of this disclosure.

In certain embodiments, the electronic device 301 of FIG. 3 performs a process of FIG. 4, although the disclosure is not so limited. The operation described as being performed by the electronic device may be implemented with instructions capable of being performed (or executed) by the processor 320 of the electronic device 301. The instructions may be stored in, for example, a computer-readable recording medium or the memory 330 of the electronic device 301 illustrated in FIG. 3.

Referring to FIG. 4, in operation 1001, an electronic device (e.g., the electronic device 301 of FIG. 3 and/or the processor 320 of FIG. 3) may store first raw image data captured by the image sensor 230 or camera, in a memory (e.g., the memory 330 of FIG. 3). The first raw image data may be data captured by a user by pressing the shutter of a camera (e.g., the camera module 180 of FIGS. 1 and 2) including an image sensor (e.g., the image sensor 230 of FIG. 2). The first raw image data may correspond to the raw image data described with reference to FIG. 3.

In operation 1003, the electronic device may generate first small raw image data from the first raw image data. The size of the first small raw image data may be smaller than the size of the first raw image data, either in data consumed (as in the case of compression) or in number of pixels (as in the case of down scaling, down sampling, or decimation). For example, the electronic device 301 may generate the first small raw image data by performing at least one of down scaling, down sampling, or compression on the first raw image data. The first small raw image data may include at least one object that is also included in the first raw image data. The first small raw image data may correspond to the small raw image data described with reference to FIG. 3.

In operation 1005, the electronic device may transmit the first small raw image data to a first external electronic device (e.g., the first external electronic device 401 and/or the processor 420 of FIG. 3).

In operation 1007, the electronic device may receive object region information from the first external electronic device. The object region information may refer to information for identifying at least one object of the first small raw image data. For example, the object region information may refer to information for identifying a region where at least one object of the first small raw image data is located. Because the first small raw image data and the first raw image data include at least one object the same as each other, according to the object region information, at least one of objects included in the first raw image data may be identified.

In operation 1009, the electronic device may transmit data associated with the first region of the first raw image data to a second external electronic device (e.g., the second external electronic device 501 and/or the processor 520 of FIG. 3). The electronic device may transmit data associated with the first region of the first raw image data to the second external electronic device based on a condition associated with an object. In an embodiment, the condition associated with an object may be a user input associated with the selection of the first region. For example, the electronic device may transmit data associated with the first region of the first raw image data to the second external electronic device based on a user input associated with the selection of the first region.

Figure 5A:
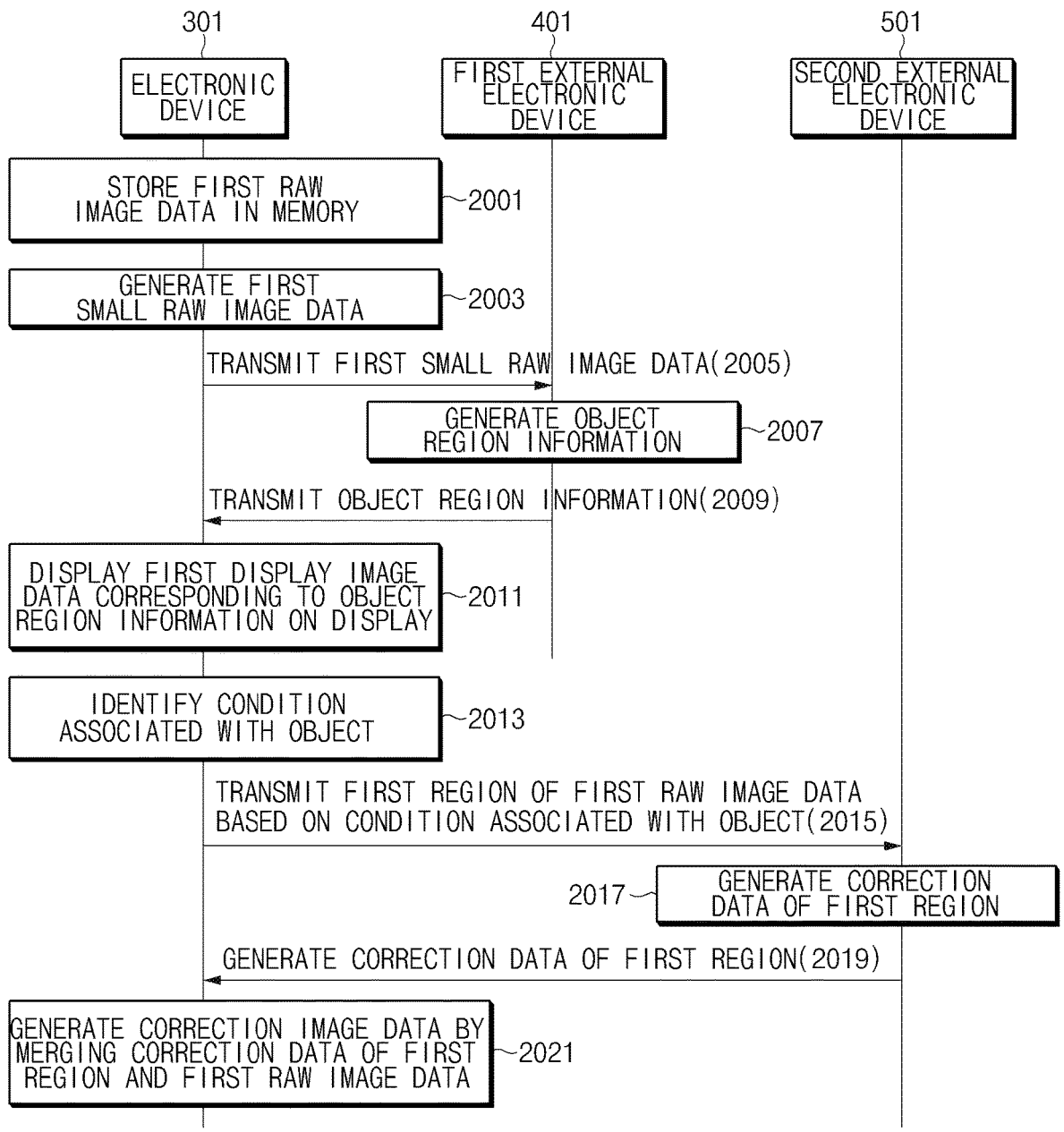
FIG. 5A is a flowchart for describing a method in which an electronic device performs image processing, according to an embodiment of this disclosure.
Figure 5B:
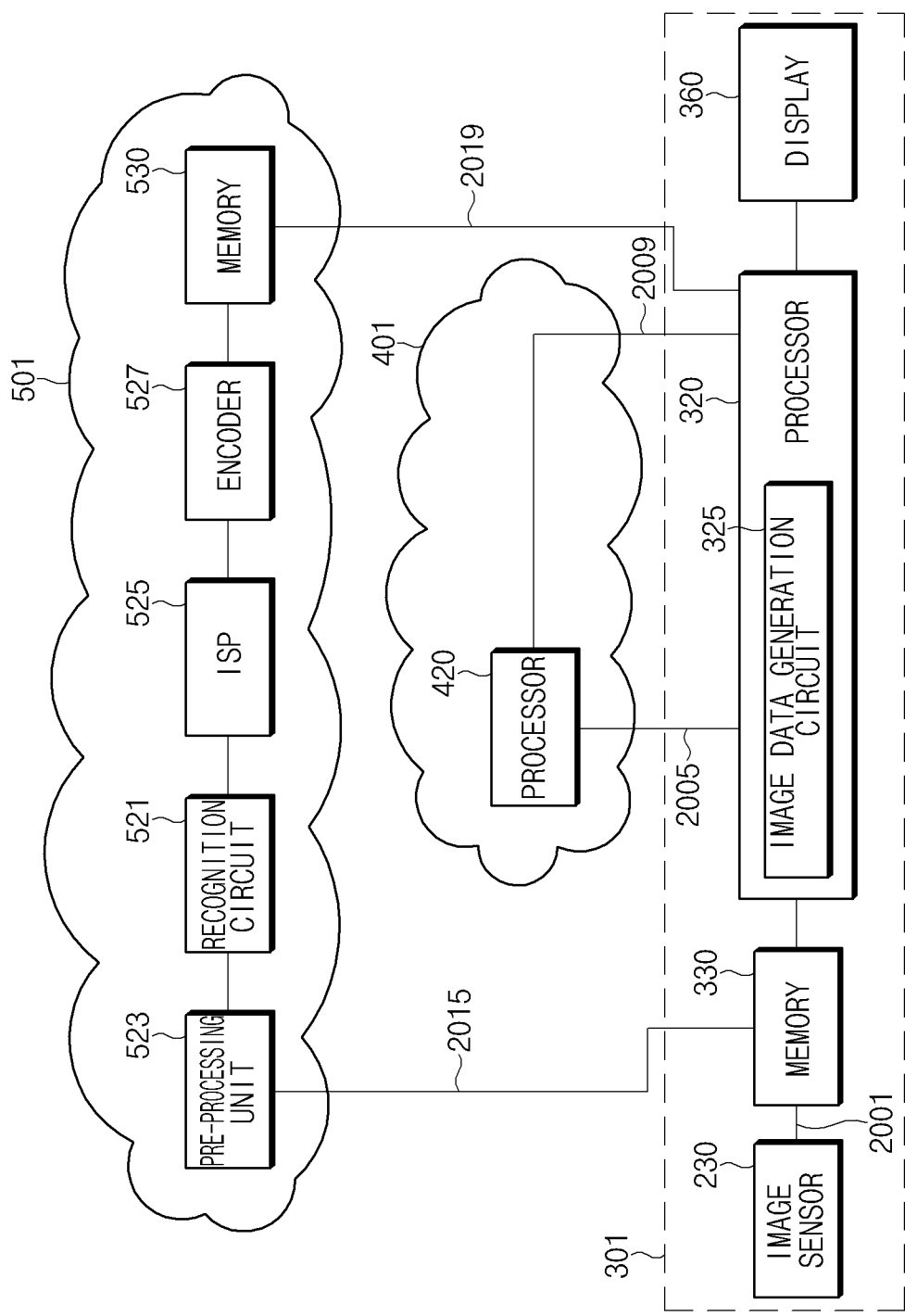
FIG. 5B is a conceptual diagram for describing operations of an electronic device, a first external electronic device, and a second external electronic device, according to an embodiment of this disclosure.

FIG. 5A is a flowchart for describing a method in which the electronic device 301 performs image processing, according to an embodiment of this disclosure. FIG. 5B is a conceptual diagram for describing operations of the electronic device 301, the first external electronic device 401, and the second external electronic device 501, according to an embodiment of this disclosure. For clarity of descriptions, contents the same as the above-described details are briefly described or omitted.

In summary, the electronic device 301 stores first raw image data in the memory 330 at 2001 and generates first small raw image data at 2003. At 2005, the electronic device 301 using the communication circuit 390 transmits the first raw image data at 2005 to the first external electronic device 401. At 2007, the first external electronic device 401 generates object region information, and transmits the object region information to the electronic device 301 at 2009. At 2011, the electronic device 301 displays first display image data corresponding to the object region information on the display 360, and identifies a condition associated with the object at 2013 and transmits the first region of first raw image data based on the condition to the second external electronic device 501 at 2015. The second external electronic device 501 generates correction data of the first region at 2017, and transmits the correction data to the electronic device 301 at 2019. At 2021, the electronic device 301 generates corrected image data by merging the correction data and the first raw image data.

Hereinafter, it is assumed that the electronic device 301 of FIG. 3 performs a process of FIG. 5A. The operation described as being performed by the electronic device may be implemented with instructions capable of being performed (or executed) by the processor 320 of the electronic device 301. The instructions may be stored in, for example, a computer-readable recording medium or the memory 330 of the electronic device 301 illustrated in FIG. 3.

Referring to FIGS. 3, 5A, and 5B, in operation 2001, the electronic device 301 (e.g., the processor 320 of FIG. 3) may store the first raw image data captured by the image sensor 230, in the memory 330. Operation 2001 may correspond to operation 1001 of FIG. 4.

Figure 6:
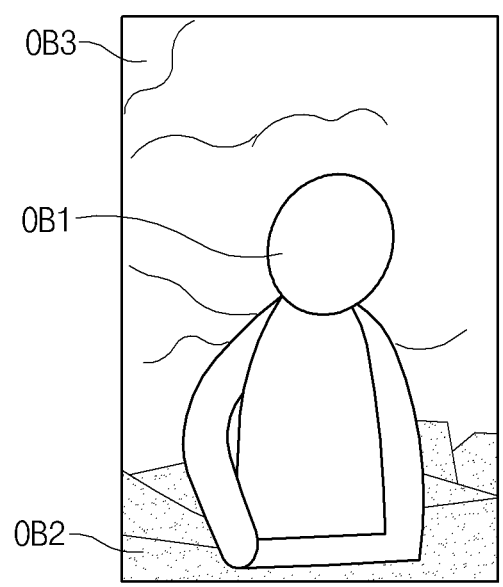
FIG. 6 is a view for describing first raw image data, according to an embodiment of this disclosure.

FIG. 6 is a view for describing first raw image data, according to an embodiment of this disclosure.

Referring to FIG. 6, first raw image data (the entire image) may include at least one object. For example, at least one object may include a first object OB1, a second object OB2, and/or a third object OB3.

Referring to FIGS. 3, 4, 5A, and 5B, in operation 2003, the electronic device 301 may generate first small raw image data from the first raw image data. For example, the first small raw image data may include first, second and third objects (e.g., the first, second, and third objects OB1, OB2, and OB3 of FIG. 6) similarly to the first raw image data. At noted above, the first small raw image may be thumbnail have lower number of pixels, or may have be JPEG representation. In certain embodiments, the first small image may be a JPEG representation of a lower resolution picture of first raw image data.

In an embodiment in which the image data generation circuit 325 forms a portion of the processor 320, the first small raw image data may be generated by the processor 320 of the electronic device 301. In an embodiment in which the image data generation circuit 325 is formed as a separate circuit, the first small raw image data may be generated by the image data generation circuit 325 of the electronic device 301. In an embodiment in which the image data generation circuit 325 is included in the processor 320, as illustrated in FIGS. 5A and 5B, the first small raw image data may be generated by the image data generation circuit 325.

In operation 2005, the electronic device 301 may transmit the first small raw image data to the first external electronic device 401 (e.g., the processor 420).

In operation 2007, the first external electronic device 401 may generate object region information. Operation 2007 is described in further detail in FIG. 9. For example, the object region information may include first, second, and third object region information for identifying the first, second, and third objects (e.g., the first, second, and third objects OB1, OB2, and OB3 of FIG. 6), respectively. The object region information may refer to information capable of identifying a region where the first, second and third objects (e.g., the first, second, and third objects OB1, OB2, and OB3 of FIG. 6) are positioned, in the first small raw image data. Because the first small raw image data and the first raw image data include at least one object the same as each other, according to the object region information, at least one of the first, second, and third objects (e.g., the first, second, and third objects OB1, OB2, and OB3 of FIG. 6) may be identified in the first raw image data.

For example, the object region information may be an identification of a block in the small raw image data or the raw image data that includes the pixels forming the object.

In operation 2009, the first external electronic device 401 may transmit the object region information to the electronic device 301; the electronic device 301 may receive the object region information.

In operation 2011, the electronic device 301 may display first display image data corresponding to object region information on the display 360. For example, the electronic device 301 may display the first, second, and third objects included in the first small raw image data separately from one another based on the object region information to generate the first display image data.

For example, the electronic device 301 may identify the first object of the first small raw image data, based on first object region information. The electronic device 301 may generate the first display image data by displaying a mark for distinguishing the first object from another object, in the identified first object.

Figure 7A:
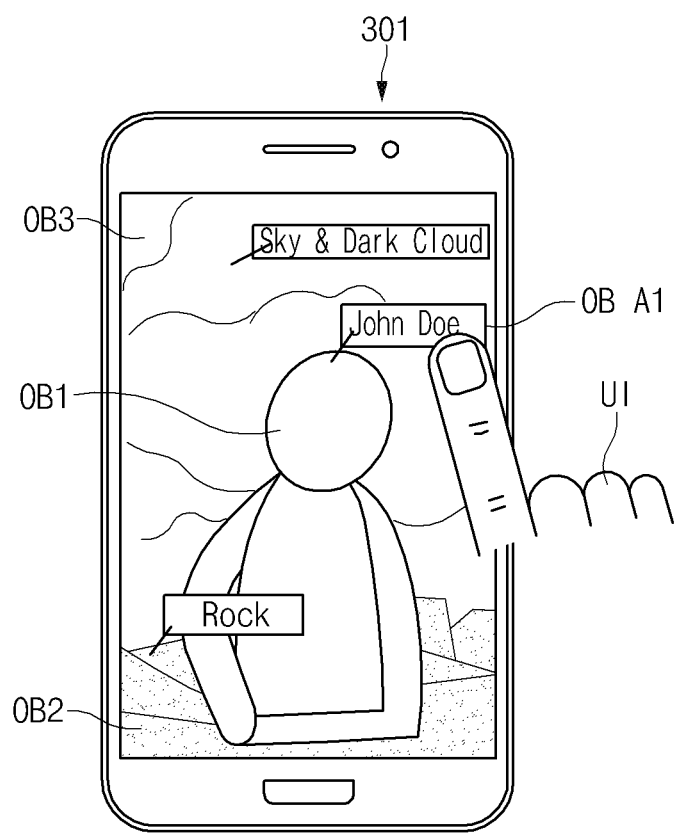
FIGS. 7A and 7B are views for describing first raw image data, according to an embodiment of this disclosure, respectively.
Figure 7B:
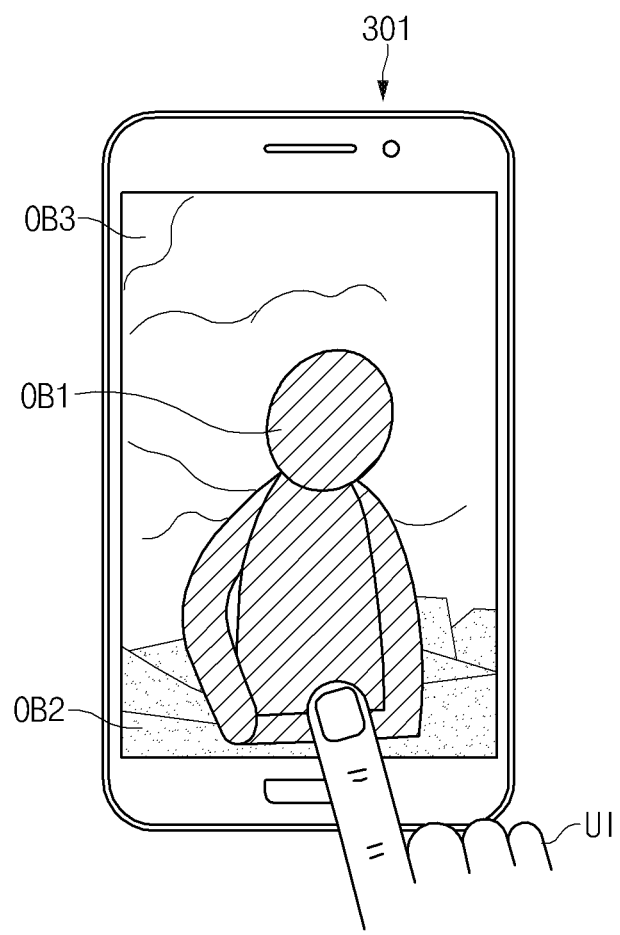

FIGS. 7A and 7B are views for describing first raw image data, according to an embodiment of this disclosure, respectively.

According to an embodiment, as illustrated in FIG. 7A, the electronic device 301 may display a tag for identifying (or distinguishing) at least one respective object, on the at least one respective object of the identified first small raw image data, based on object region information. For example, the electronic device 301 may display a tag for identifying the first, second, and third objects OB1, OB2, and OB3, on the first, second, and third objects OB1, OB2, and OB3 of the identified first small raw image data based on the object region information. For example, the first display image data may include a tag (e.g., OBA1) for identifying the first object OB1 of the first small raw image data. The tag may include at least one of a category or a name of at least one object. For example, the tag may include categories (e.g., people, backgrounds, or animals) or names (e.g., sky, clouds, rocks, or a name of a person) of the first, second, and third objects OB1, OB2, and OB3.

According to an embodiment, as illustrated in FIG. 7B, the electronic device 301 may display a region of at least one object of the identified first small raw image data, based on the object region information. For example, the electronic device 301 may display the region corresponding to the first object OB1 of the identified first small raw image data based on the object region information to be distinguished from the second and third objects OB2 and OB3. For example, the first display image data may include information indicating a region corresponding to at least one object of the first small raw image data.

Referring to FIGS. 3, 5A and 5B, in operation 2013, the electronic device 301 may identify a condition associated with an object. In an embodiment, the condition associated with an object may be a user input associated with the selection of the object. For example, a user may select an object from the first display image data displayed on the display 360.

According to an embodiment, as illustrated in FIG. 7A, the electronic device 301 may identify the user input UI associated with the selection of the first object OB1. For example, the user may watch the first display image data displayed through the display 360 and then may select the first object OB1 or a tag OBA1 indicating the first object OB1. The electronic device 301 may identify a user input UI and then may determine that the first object OB1 is selected from at least one object included in the first small raw image data from the user.

According to an embodiment, as shown in FIG. 7B, the electronic device 301 may identify the user input UI associated with the selection of the first object OB1. For example, the user may watch the first display image data displayed through the display 360 to select a region indicating the first object OB1, and thus may select the first object OB1. The electronic device 301 may identify a user input UI and then may determine that the first object OB1 is selected from at least one object included in the first small raw image data from the user. As noted above, the user input may include a touch input touching a portion of the display that the objection OB1 is displayed on.

Referring to FIGS. 3, 5A, and 5B, in operation 2015, the electronic device 301 may transmit data associated with the first region of the first raw image data to the second external electronic device 501 based on a condition associated with an object. In an embodiment in which a condition associated with an object is a user input to select the first object among the identified at least one object, the electronic device 301 may transmit only the data associated with the first region of the first raw image data corresponding to the first object region information among the object region information, to the second external electronic device 501. For example, the first region of the first raw image data transmitted by the electronic device 301 to the second external electronic device 501 may include the first object (e.g., the first object OB1 of FIG. 6) and may not include the second and third objects (e.g., the second and third objects OB2 and OB3 of FIG. 6). In the embodiment of FIG. 7B, the object may be the body of the person in object OB1.

Figure 8:
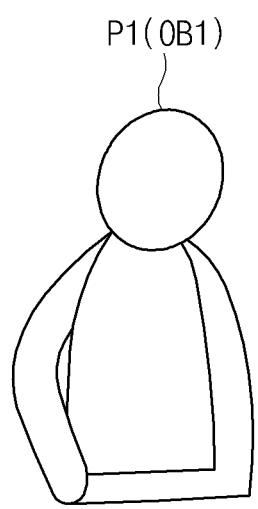
FIG. 8 is a view for describing a first region of first raw image data, according to an embodiment of this disclosure.

FIG. 8 is a view for describing a first region of first raw image data, according to an embodiment of this disclosure.

Referring to FIG. 8, in an embodiment in which a condition associated with an object is a user input associated with the selection of the first region (e.g., the first object OB1 in FIGS. 7A and 7B), the electronic device 301 may transmit data associated with the first region P1 of the first raw image data to the second external electronic device 501, based on the user input (e.g., the user input UI of FIGS. 7A and 7B) and object region information. For example, when a user selects the first object OB1 with the user input, the electronic device 301 may transmit only the data associated with the first object OB1 of the first raw image data, to the second external electronic device 501.

Referring to FIGS. 3, 5A, and 5B, in operation 2017, the second external electronic device 501 may generate correction data of the first region of the first raw image data. The second external electronic device 501 may generate the correction data of the first region by performing image processing on the first region of the first raw image data, based on data associated with the first region (e.g., a first region P1 of FIG. 8) received from the electronic device 301. Operation 2017 is described in further detail in FIG. 10.

In operation 2019, the second external electronic device 501 may transmit the correction data of the first region to the electronic device 301; the electronic device 301 may receive the correction data of the first region from the second external electronic device 501.

In operation 2021, the electronic device 301 may generate the corrected image data by merging the correction data of the first region and the first raw image data of the remaining regions other than the first region.

When the first raw image data includes multiple objects, the electronic device 301 may transmit the first small raw image data including the multiple objects to the first external electronic device 401 and may transmit data associated with only the object (e.g., the first object) selected by the user, to the second external electronic device 501. This reduces time and cost required for image processing using the second external electronic device 501.

For example, the electronic device 301 may transmit the first small raw image data smaller in size than the first raw image data, to the first external electronic device 401, and thus may quickly receive object region information from the first external electronic device 401. The electronic device 301 may quickly display the first display image data corresponding to the received object region information to the user through the display 360. When the user desires image processing using computer-based technology difficult to perform on an electronic device such as an image backup function and a new media content generation function with respect to the first object, the user may select the first object, using the first display image data. The electronic device 301 can transmit only the data associated with the first region to the second external electronic device 501. This alleviates transmitting all of the first raw image data of a large size to the second external electronic device 501. As such, according to an embodiment of this disclosure, the time required is reduced. Accordingly, the electronic device 301 may receive correction data of the first region from the second external electronic device 501 within a shorter time.

Figure 9:
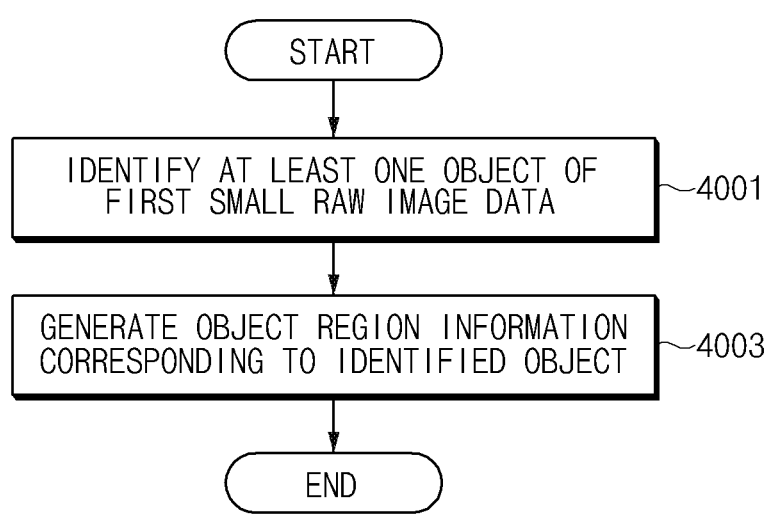
FIG. 9 is a flowchart for describing an operation in which a first external electronic device provides object region information to an electronic device, according to an embodiment of this disclosure.

FIG. 9 is a flowchart for describing an operation in which the first external electronic device 401 provides object region information to the electronic device 301, according to an embodiment of this disclosure. FIG. 9 may be a flowchart for describing operation 2007 of FIG. 5A. For clarity of descriptions, contents the same as the above-described details are briefly described or omitted.

Referring to FIG. 9, in operation 4001, the first external electronic device 401 (e.g., the processor 420 of FIG. 3) may identify at least one object of the first small raw image data received from the electronic device 301. For example, when the first small raw image data includes the first, second, and third objects (e.g., the first, second, and third objects OB1, OB2, and OB3 of FIG. 6), the first external electronic device 401 may distinguish the first object and the second object, may distinguish the first object and the third object, and may distinguish the second object and the third object.

In operation 4003, the first external electronic device 401 may generate object region information corresponding to each of the identified objects. For example, the object region information may include information about a region where the identified object is positioned in the first small raw image data.

Figure 10:
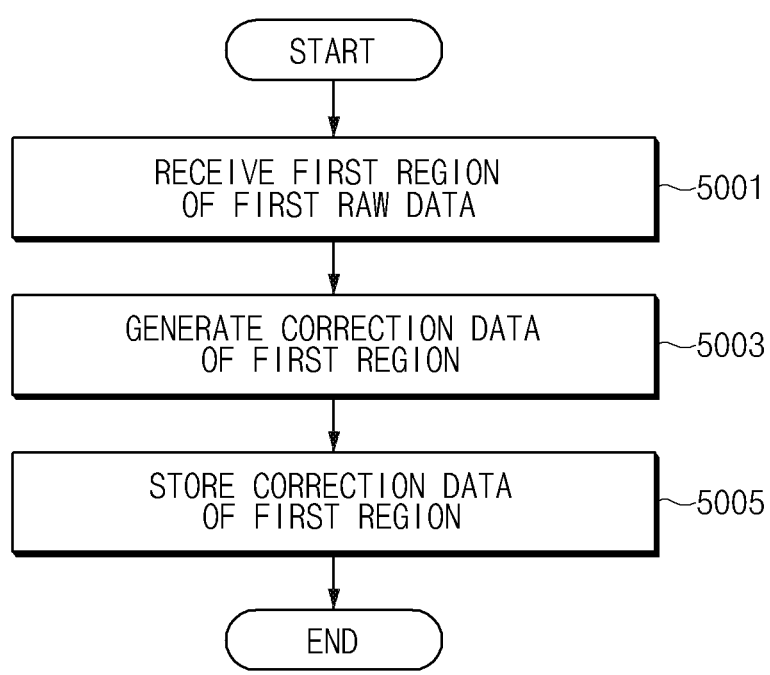
FIG. 10 is a flowchart for describing an operation in which a second external electronic device provides correction data of a first region to an electronic device, according to an embodiment of this disclosure.

FIG. 10 is a flowchart for describing an operation in which the second external electronic device 501 provides correction data of a first region to the electronic device 301, according to an embodiment of this disclosure. FIG. 10 may be a flowchart for describing operation 2017 of FIG. 5A. For clarity of descriptions, contents the same as the above-described details are briefly described or omitted.

Referring to FIG. 10, in operation 5001, the second external electronic device 501 (e.g., the processor 520 of FIG. 3) may receive data associated with a first region (e.g., the first region P1 of FIG. 8) of first raw data. For example, the first region of the first raw data may be a partial region of the first raw data corresponding to the first object selected by a user. For example, a first region of the first raw data may be a partial region of the first raw data that includes only the first object selected by a user and no other objects not selected by the user.

In operation 5003, the second external electronic device 501 (e.g., the ISP 525 of FIG. 3) may generate correction data of the first region. The second external electronic device

501 may generate the correction data of the first region by performing image processing on the first region of the first raw image data.

In operation 5005, the second external electronic device 501 (e.g., the processor 520 of FIG. 3) may store the correction data of the first region in a memory (e.g., the memory 530 of FIG. 3).

Figure 11:
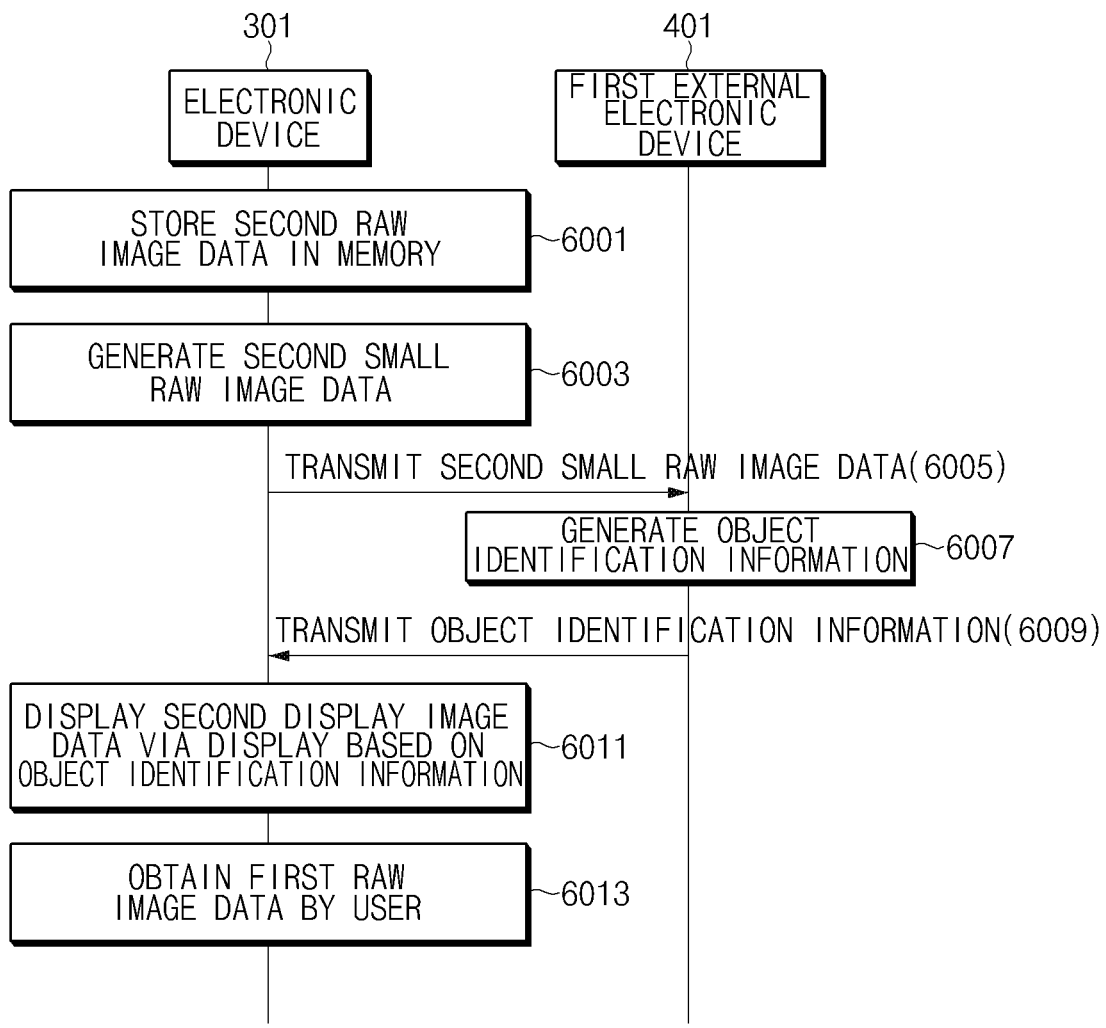
FIG. 11 is a flowchart for describing a method in which an electronic device performs image processing, according to an embodiment of this disclosure.

FIG. 11 is a flowchart for describing a method in which the electronic device 301 performs image processing, according to an embodiment of this disclosure. FIG. 11 may be a diagram for describing an operation before operation 2001 of FIG. 5A is performed. For clarity of descriptions, contents the same as the above-described details are briefly described or omitted.

In certain embodiments, the electronic device 301 of FIG. 3 can performs a process of FIG. 11. The operation described as being performed by the electronic device may be implemented with instructions capable of being performed (or executed) by the processor 320 of the electronic device 301. The instructions may be stored in, for example, a computer-readable recording medium or the memory 330 of the electronic device 301 illustrated in FIG. 3.

Referring to FIGS. 3 and 11, in operation 6001, the electronic device 301 may store second raw image data captured by the image sensor 230, in the memory 330. For example, the second raw image data may refer to image data of a scene that a user is watching through a camera in a live view mode while the user does not capture the scene by pressing the shutter of the camera (e.g., the camera module 180 of FIGS. 1 and 2). In the live view mode, the image sensor 230 may store the scene watched by the user through the camera as the second raw image data in the memory 330.

In operation 6003, the electronic device 301 may generate second small raw image data from the second raw image data. The size of the second small raw image data may be smaller than the size of the second raw image data. The electronic device 301 may generate the second small raw image data by performing at least one of down scaling, down sampling, or compression on the second raw image data.

The second small raw image data may include at least one object included in the second raw image data. For example, when the user is watching a scene including first, second, and third objects through the camera (e.g., in a live view mode), the second raw image data may include the first, second, and third objects, and the second small raw image data may include the first, second, and/or third object.

In operation 6005, the electronic device 301 may transmit the second small raw image data to the first external electronic device 401.

In operation 6007, the first external electronic device 401 may generate object identification information based on the received second small raw image data. The object identification information may be information indicating whether at least one object included in the second small raw image data is capable of being identified. For example, the object identification information may include information indicating success or failure of object identification.

For example, the success of object identification may mean that at least one object included in the second small raw image data is identified. For example, when the first external electronic device 401 segments and recognizes at least one object to identify the object, the success of object identification may indicate that the first external electronic device 401 segments and recognizes at least one object included in the second small raw image data. In the case where the object identification information includes information indicating the success of object identification, the object identification information may indicate that the second external electronic device 501 is available when the user captures a scene, which the user is watching through the camera, by pressing a camera shutter.

For example, the failure of object identification may mean that at least one object included in the second small raw image data is not identified. For example, when the first external electronic device 401 segments and recognizes at least one object to identify the object, the failure of object identification may indicate that the first external electronic device 401 does not segment and recognize at least one object included in the second small raw image data. In the case where the object identification information includes information indicating the failure of object identification, the object identification information may indicate that the second external electronic device 501 is not available when the user captures a scene, which the user is watching through the camera, by pressing a camera shutter.

In operation 6009, the electronic device 301 may receive object identification information from the first external electronic device 401.

In operation 6011, the electronic device 301 may display the second display image data on the display 360 based on the object identification information. For example, the electronic device 301 may display the second display image data including an icon in the second small raw image data, on the display 360. For example, the icon may be an object displayed to the user via the display 360. For example, when the user captures a scene that the user is watching through the camera by pressing the camera shutter, the icon may be an object indicating whether the second external electronic device 501 is available.

When the object identification information includes information indicating the failure of the object identification, the electronic device 301 may convert the attribute of the icon display of the second display image data. For example, when the object identification information includes information indicating the failure of object identification, the electronic device 301 may convert at least one of the brightness of icon display, the chroma of icon display, or the image of an icon of the second display image data. For example, when the object identification information includes information indicating the failure of the object identification, the electronic device 301 may deactivate the icon display of the second display image data. An event that the attribute of the icon display of the second display image data is converted may mean that image processing through the second external electronic device 501 is not available, when the user captures the scene, which the user is watching via the electronic device 301.

When the object identification information includes information indicating the success of the object identification, the electronic device 301 may not convert the attribute of the icon display of the second display image data. An event that the attribute of the icon display of the second display image data is not converted may mean that image processing through the second external electronic device 501 is available, when the user captures the scene, which the user is watching via the electronic device 301.

Figure 12A:
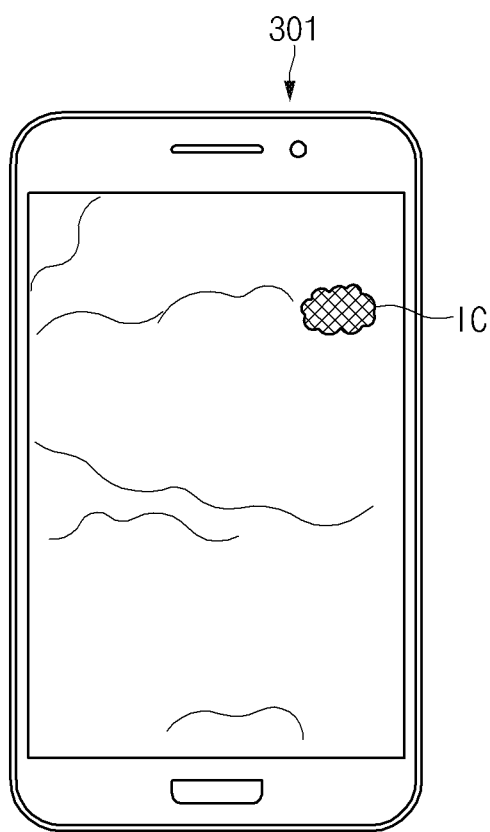
FIGS. 12A and 12B are views for describing object identification information and second display image data, according to an embodiment of this disclosure.
Figure 12B:
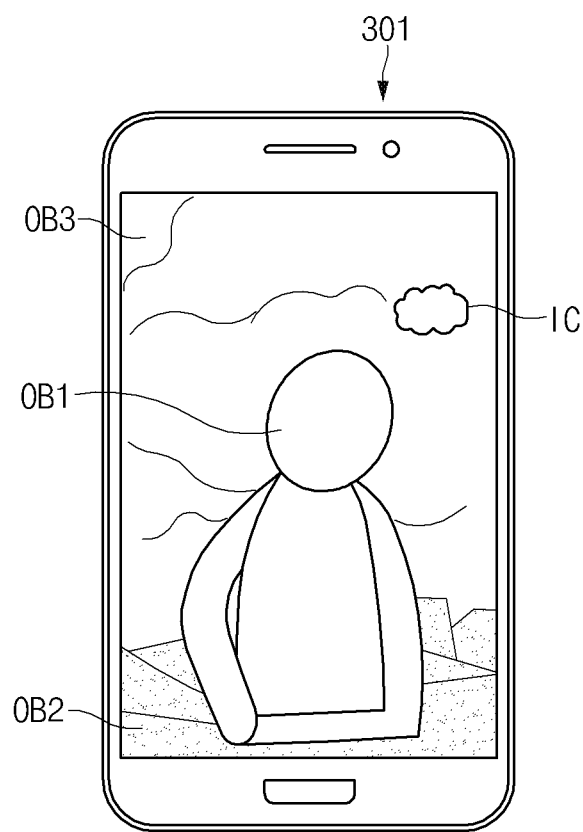

FIGS. 12A and 12B are views for describing object identification information and second display image data, according to an embodiment of this disclosure.

In an embodiment, referring to FIG. 12A, the scene displayed through the electronic device 301 may correspond to second display image data. FIG. 12A may be a case where information indicating failure of object identification is included in object identification information. The electronic device 301 may convert the display attribute of icon IC of the second display image data.

In an embodiment, referring to FIG. 12B, the scene displayed through the electronic device 301 may correspond to second display image data. FIG. 12B may be a case where information indicating success of object identification is included in the object identification information. The electronic device 301 might not convert the display attribute of icon IC of the second display image data. For example, the user may be watching a scene including first, second, and third objects OB1, OB2, and OB3 through the electronic device 301. The scene that the user is watching through the electronic device 301 may be stored in the memory 330 as second raw image data. The electronic device 301 may generate second small raw image data from the second raw image data and may transmit the second small raw image data to the first external electronic device 401. The first external electronic device 401 may identify the first, second, and third objects OB1, OB2, and OB3 of the second small raw image data. The electronic device 301 may receive the object identification information including information indicating the success of object identification from the first external electronic device 401 and may display the second display image data, on which the display of icon IC is activated, on the display 360.

Referring to FIGS. 3 and 11, in operation 6013, the electronic device 301 may obtain first raw image data by the user. For example, when the user captures the scene being watched via the electronic device 301 through the camera, the user may recognize that the second external electronic device 501 is available, based on an event that the display of icon IC of the second display image data is activated. For example, when a user captures a scene being watched via the electronic device 301 through the camera, the electronic device 301 may obtain first raw image data.

The electronic device 301 may store the obtained first raw image data in the memory 330 (operation 2001 of FIG. 5A).

Figure 13:
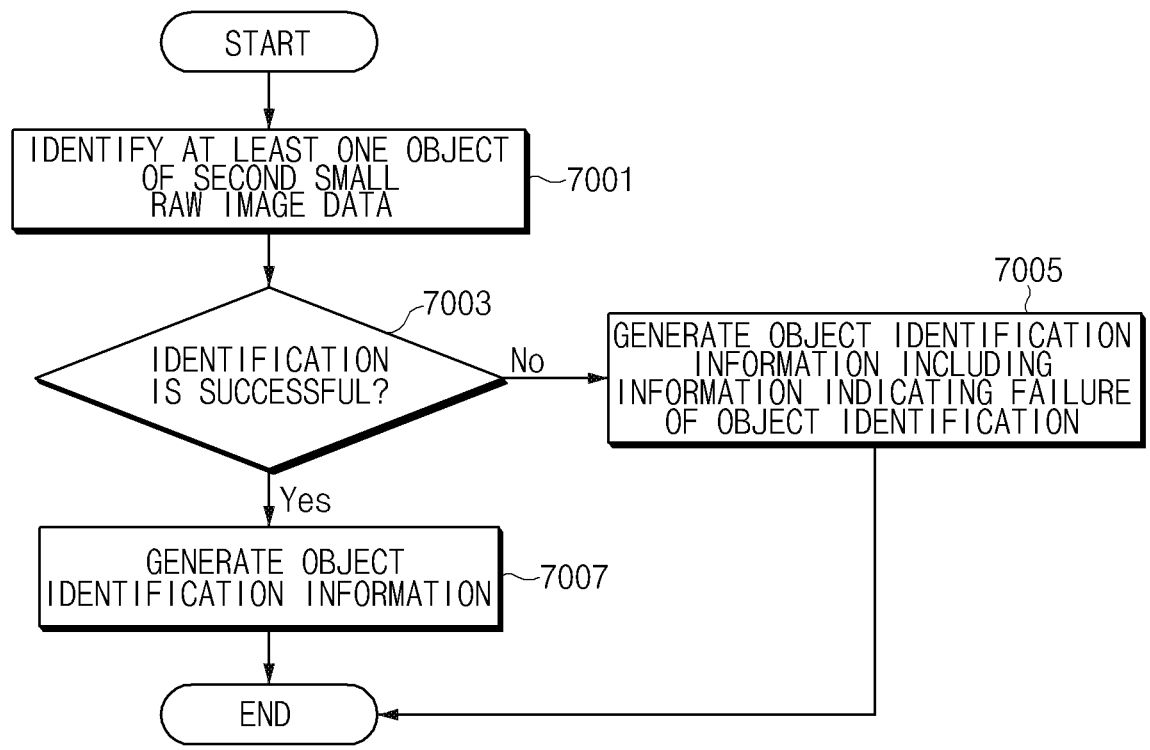
FIG. 13 is a flowchart for describing an operation in which a first external electronic device provides object identification information to an electronic device, according to an embodiment of this disclosure.

FIG. 13 is a flowchart for describing an operation in which the first external electronic device 401 provides object identification information to the electronic device 301, according to an embodiment of this disclosure. FIG. 13 may be a flowchart for describing operation 6007 of FIG. 11. For clarity of descriptions, contents the same as the above-described details are briefly described or omitted.

Referring to FIG. 13, in operation 7001, the first external electronic device 401 may identify at least one object of the second small raw image data received from the electronic device 301. For example, when the second small raw image data includes first, second, and third objects, the first external electronic device 401 may distinguish the first object and the second object, may distinguish the first object and the third object, and may distinguish the second object and the third object.

In operation 7003, the first external electronic device 401 may determine whether identification of at least one object is successful.

In operation 7005, when the first external electronic device 401 fails to identify at least one object (refer to FIG. 12A), the first external electronic device 401 may generate object identification information including information indicating failure of object identification.

In operation 7007, when the first external electronic device 401 succeeds in identifying at least one object (refer to FIG. 12B), the first external electronic device 401 may generate object identification information for identifying at least one object.

Figure 14:
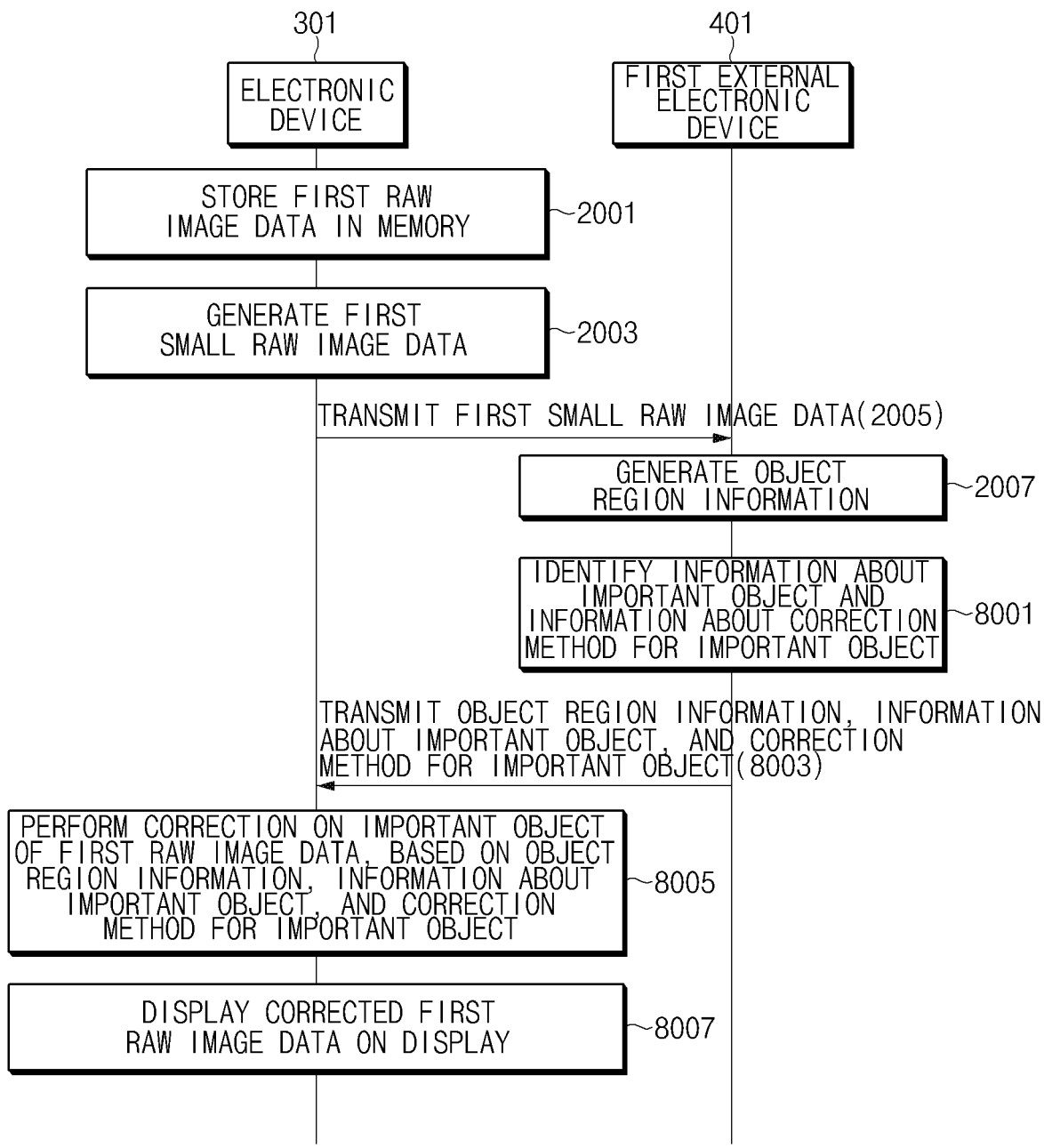
FIG. 14 is a flowchart for describing a method in which an electronic device performs image processing, according to an embodiment of this disclosure.

FIG. 14 is a flowchart for describing a method in which the electronic device 301 performs image processing, according to an embodiment of this disclosure. For clarity of descriptions, contents the same as the above-described details are briefly described or omitted.

Hereinafter, it is assumed that the electronic device 301 of FIG. 3 performs a process of FIG. 14. The operation described as being performed by the electronic device may be implemented with instructions capable of being performed (or executed) by the processor 320 of the electronic device 301. The instructions may be stored in, for example, a computer-readable recording medium or the memory 330 of the electronic device 301 illustrated in FIG. 3.

Referring to FIG. 14, operation 2001, operation 2003, operation 2005, and operation 2007 may be the same as operation 2001, operation 2003, operation 2005, and operation 2007 of FIG. 5, respectively.

In operation 8001, the first external electronic device 401 (e.g., the processor 420) may identify information about an important object and information about a correction method for the important object.

The first external electronic device 401 may identify an important object in the identified object regions based on the generated object region information and may generate information about the important object. The first external electronic device 401 may generate information about the correction method for an important object. For example, the correction method for the important object may include information about correction intensity for an important object, information about the application of blur processing to an important object, and/or information about the insertion of augmented reality (AR) objects into an important object.

In an embodiment, the first external electronic device 401 may store information about an important object. For example, when a background and a person are identified from first small raw image data, information indicating that the person is an important object may be stored in the first external electronic device 401. For example, when the person's face, body, hair, and/or clothing is identified from the first small raw image data, information indicating that the skin tone and eyes of the person's face are important objects may be stored in the first external electronic device 401. When a person is included in the identified object, the first external electronic device 401 may generate information indicating that a person or the person's skin tone and an eye is an important object, based on the created object region information.

In an embodiment, the first external electronic device 401 may identify an important object based on regional information of the first external electronic device 401. For example, information about a landmark of an area where the first external electronic device 401 is positioned may be stored in the first external electronic device 401 as information about an important object. When a landmark is included in the identified objects, the first external electronic device 401 may generate information about the landmark or information indicating that the landmark is an important object, based on the generated object region information.

In an embodiment, the first external electronic device 401 may identify an important object based on information stored by the operator of the first external electronic device 401. When the first external electronic device 401 is operated in connection with a commercial event, the operator of the first external electronic device 401 may allow the first external electronic device 401 to perform blur processing on some objects or to insert an AR object in response to another object. For example, in the case where the first external electronic device 401 is operated at a concert venue, the first external electronic device 401 may generate information indicating that an object corresponding to the person on the stage is an important object when a person on the stage is identified among the identified objects. For example, in the case where the first external electronic device 401 is operated at a concert venue, the first external electronic device 401 may generate information indicating that an object corresponding to the signboard is an important object when a signboard is identified among the identified objects.

In operation 8003, the first external electronic device 401 may transmit object region information, information about an important object, and/or a correction method for an important object to the electronic device 301.

In operation 8005, the electronic device 301 may perform correction on an important object of the first raw image data, based on the object region information, the information about an important object, and/or the correction method for an important object, which is received from the first external electronic device 401. For example, the electronic device 301 may identify at least one object included in the first raw image data based on object region information received from the first external electronic device 401. The electronic device 301 may identify an important object among the identified at least one object based on information about an important object received from the first external electronic device 401. The electronic device 301 may generate the corrected first raw image data by performing image processing on an important object, based on the correction method for an important object received from the first external electronic device 401.

For example, when the correction method for an important object received from the first external electronic device 401 includes information about the correction strength for the important object, the electronic device 301 may perform image processing by setting the correction strength for the important object in the first raw image data to be higher than the correction strength for the remaining identified objects, and thus may generate the corrected first raw image data.

For example, when the correction method for an important object received from the first external electronic device 401 includes information about the application of blur processing to the important object, the electronic device 301 may perform blur processing on the important object in the first raw image data, and thus may generate the corrected first raw image data.

For example, when the correction method for an important object received from the first external electronic device 401 includes information about the insertion of the AR object into the important object, the electronic device 301 may insert an AR object on the important object from the first raw image data, and thus may generate the corrected first raw image data.

In operation 8007, the electronic device 301 may display the corrected first raw image data on the display (e.g., the display 360 in FIG. 3).

Figure 15:
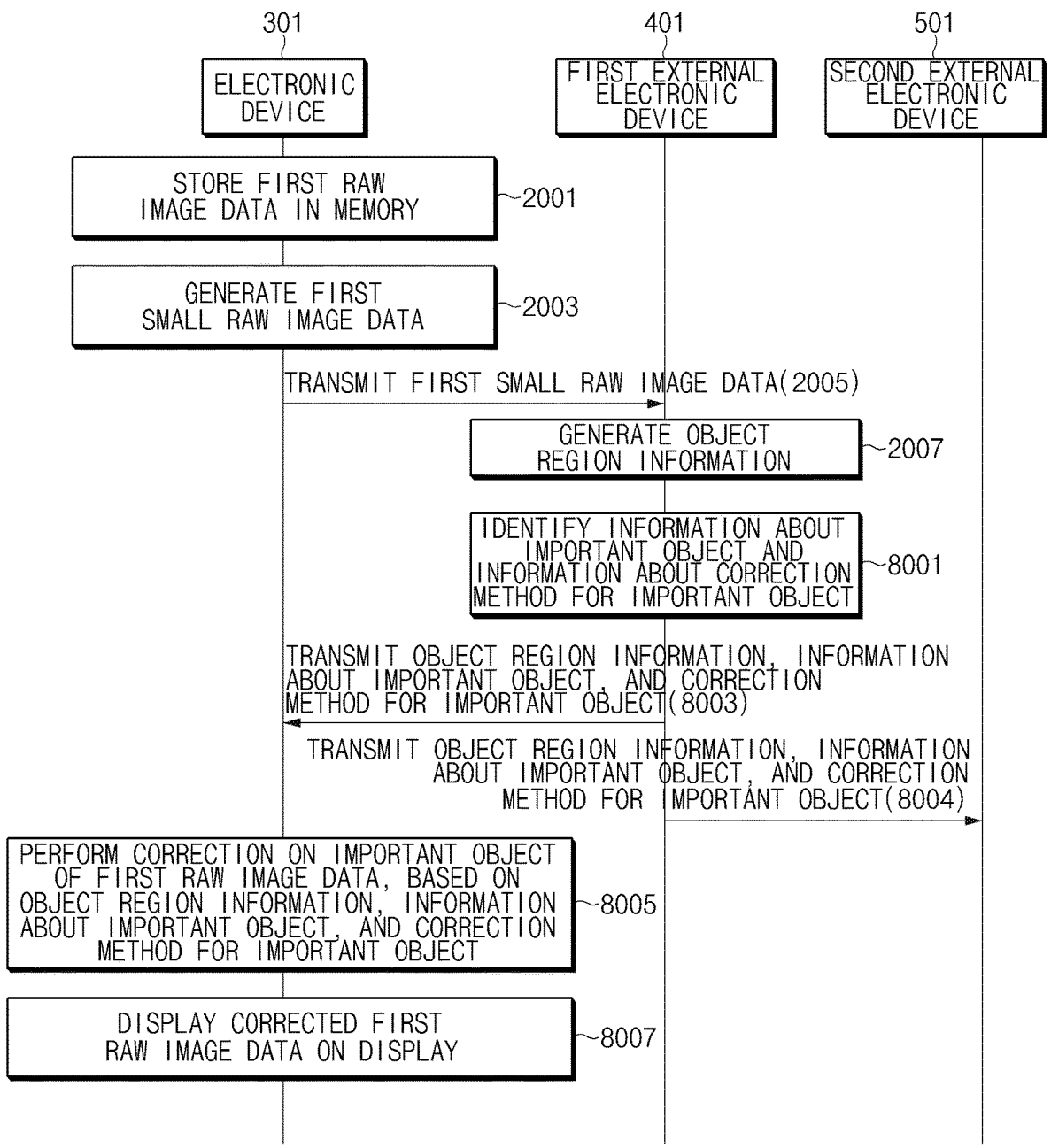
FIG. 15 is a flowchart for describing a method in which an electronic device performs image processing, according to an embodiment of this disclosure.

FIG. 15 is a flowchart for describing a method in which the electronic device 301 performs image processing, according to an embodiment of this disclosure. For clarity of descriptions, contents the same as the above-described details are briefly described or omitted.

Below, it is assumed that the electronic device 301 of FIG. 3 performs a process of FIG. 15. The operation described as being performed by the electronic device may be implemented with instructions capable of being performed (or executed) by the processor 320 of the electronic device 301. The instructions may be stored in, for example, a computer-readable recording medium or the memory 330 of the electronic device 301 illustrated in FIG. 3.

Referring to FIG. 15, operation 2001, operation 2003, operation 2005, and operation 2007 may be the same as operation 2001, operation 2003, operation 2005, and operation 2007 of FIG. 5, respectively. Operation 8001, operation 8003, operation 8005, and operation 8007 may be substantially the same as operation 8001, operation 8003, operation 8005, and operation 8007 of FIG. 14, respectively.

In operation 8004, the first external electronic device 401 may transmit object region information, information about an important object, and a correction method for an important object to the second external electronic device 501.

When a partial region of the first raw image data is transmitted to the second external electronic device 501 by the user's selection, the second external electronic device 501 may perform image processing on the partial region of the first raw image data, based on object region information, information about an important object, and a correction method for an important object, which are received from the first external electronic device 401. For example, when the important object is included in the partial region of the first raw image data, the second external electronic device 501 may perform image processing on the important object, based on a correction method for the important object.

In accordance with an aspect of the disclosure, an electronic device comprises a communication circuit; a display; at least one processor operatively connected to the display and the communication circuit; and a memory operatively connected to the at least one processor, wherein the memory stores instructions that, when executed, cause the at least one processor to perform a plurality of operations comprising: storing first raw image data in the memory; generating first small raw image data smaller in size than the first raw image data, from the first raw image data; transmitting the first small raw image data to a first external electronic device via the communication circuit; receiving information about an object region for identifying at least one object of the first small raw image data from the first external electronic device via the communication circuit; transmitting a first region of the first raw image data to a second external electronic device via the communication circuit based on a user input and the information about the object region; displaying first display image data corresponding to the information about the object region via the display; and identifying the user input associated with selection of the object region.

In an embodiment, the instructions may cause the processor 320 to display first display image data corresponding to the information about the object region via the display 360 and to identify the user input associated with selection of the object region.

In an embodiment, the instructions may cause the processor to display the first display image data including at least one of a category or a name of the identified at least one object via the display 360.

In an embodiment, the instructions may cause the processor 320 to generate the first small raw image data by performing at least one of down scaling, down sampling, or compression on the first raw image data.

In an embodiment, the instructions may cause the processor 320 to receive correction data of the first region from the second external electronic device 501 via the communication circuit 390 and to merge the correction data of the first region and the first raw image data.

In an embodiment, the first external electronic device 401 may be an edge server, and the second external electronic device 501 may be a server other than the edge server.

In an embodiment, the electronic device 301 may further include a camera 180. The instructions may cause the processor 320 to store second raw image data in the memory 330, to generate second small raw image data smaller in size than the second raw image data, from the second raw image data, to transmit the second small raw image data to the first external electronic device 401 via the communication circuit 390, to receive object identification information for identifying at least one object of the second small raw image data from the first external electronic device 401 via the communication circuit, to display second display image data via the display 360 based on the object identification information, and to obtain, by a user, the first raw image data through the camera 180.

In an embodiment, the instructions may cause the processor to convert an attribute of an icon display of the second display image data when information indicating failure of identification of the at least one object is included in the object identification information.

In accordance with another aspect of the invention, an image processing method of an electronic device comprises storing first raw image data in a memory; generating first small raw image data smaller in size than the first raw image data, from the first raw image data; transmitting the first small raw image data to a first external electronic device; receiving information about an object region for identifying at least one object of the first small raw image data from the first external electronic device; transmitting a first region of the first raw image data to a second external electronic device based on a user input and the information about the object region; and displaying first display image data corresponding to the information about the object region via a display, wherein the user input is associated with selection of the object region.

In an embodiment, the method may further include displaying first display image data corresponding to the information about the object region via a display 360. The user input may be associated with selection of the object region.

In an embodiment, the first display image data may include at least one of a category or a name of the identified at least one object.

In an embodiment, the generating of the first small raw image data may include performing at least one of down scaling, down sampling, or compression on the first raw image data.

In an embodiment, the method may further include receiving correction data of the first region from the second external electronic device and merging the correction data of the first region and the first raw image data.

In an embodiment, the first external electronic device may be an edge server, and the second external electronic device may be a server other than the edge server.

In an embodiment, the method may further include storing second raw image data in the memory, generating second small raw image data smaller in size than the second raw image data, from the second raw image data, transmitting the second small raw image data to the first external electronic device, receiving object identification information for identifying at least one object of the second small raw image data from the first external electronic device, displaying second display image data via a display based on the object identification information, and obtaining, by a user, the first raw image data via a camera.

In accordance with an aspect of the disclosure, an electronic device comprises a communication circuit; a display; at least one processor operatively connected to the communication circuit, and the display; and a memory operatively connected to the processor, wherein the memory stores instructions that, when executed, cause the at least one processor to perform a plurality of operations comprising: storing raw image data including first and second objects in the memory; transmitting first small raw image data including the first and second objects to a first external electronic device via the communication circuit; receiving information about first and second object regions generated based on the first small raw image data and for respectively identifying the first and second objects from the first external electronic device via the communication circuit to display the information about the first and second object regions via the display; identifying a user input associated with selection of the first object; transmitting a partial region of the raw image data, which includes the first object and does not include the second object, to a second external electronic device based on the user input; and displaying first display image data corresponding to the information about the first and second object regions via the display.

In an embodiment, the instructions may cause the processor 320 to generate the first small raw image data smaller in size than the raw image data, from the raw image data.

In an embodiment, the instructions may cause the processor 320 to generate the first small raw image data by performing at least one of down scaling, down sampling, or compression on the raw image data.

In an embodiment, the instructions may cause the processor 320 to display the first display image data including at least one of a category or a name of the identified first and second objects via the display.

In accordance with another aspect of the disclosure, an electronic device 301 may include a housing, a wireless communication circuit 390 disposed inside the housing, a camera 180 disposed inside the housing, exposed through a portion of the housing, and generating raw image data, a display 360 disposed inside the housing, viewable through a portion of the housing, and displaying an image of a first display image data generated based on the raw image data, at least one processor 320 operatively connected to the wireless communication circuit, the display, and the camera, and at least one memory 330 operatively connected to the processor and storing the raw image data. The memory may store instructions that, when executed, cause the processor to generate first small raw image data smaller in size than the raw image data based on the raw image data, to transmit the first small raw image data to a server 401 locally connected to a base station, using the wireless communication circuit, to receive first image data, which is generated based on the first small raw image data by the server and includes meta data associated with object recognition within the first small raw image data, using the wireless communication circuit, to generate second display image data, using the first display image data and the first image data, and to display an image of the second display image data on the display.

In an embodiment, the first small raw image data may further include at least one of time, a location, a place, illuminance, or weather.

In an embodiment, the instructions may cause the processor to receive a user input to select a partial region of the image of the first display image data displayed on the display and to generate the first small raw image data based at least partly on the user input.

In an embodiment, the instructions may cause the processor to receive a user input to select a partial region of the image of the second display image data displayed on the display, to generate second small raw image data to transmit the second small raw image data to an external server, based at least partly on the user input, to receive second image data generated by correcting image quality of the second small raw image data by the external server, to generate third display image data, using the raw image data and the second image data, and to display an image of the third display image data on the display.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program) including one or more instructions that are stored in a storage medium (e.g., memory 430) that is readable by a machine (e.g., the electronic device 401). For example, a processor (e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:
1. An electronic device comprising:
a communication circuit;
a display;
at least one processor operatively connected to the display and the communication circuit; and
a memory operatively connected to the at least one processor,
wherein the memory stores instructions that, when executed, cause the at least one processor to perform a plurality of operations comprising:
storing first raw image data in the memory;
generating first small raw image data smaller in size than the first raw image data, from the first raw image data;
transmitting the first small raw image data to a first external electronic device via the communication circuit;
receiving information about an object region for identifying at least one object of the first small raw image data from the first external electronic device via the communication circuit;
transmitting a first region of the first raw image data to a second external electronic device via the communication circuit based on a user input and the information about the object region; and
displaying first display image data corresponding to the information about the object region via the display.

2. The electronic device of claim 1, wherein the plurality of operations further comprising:
displaying the first display image data including at least one of a category or a name of the identified at least one object via the display.

3. The electronic device of claim 1, wherein the plurality of operations further comprising:
generating the first small raw image data by performing at least one of down scaling, down sampling, or compression on the first raw image data.

4. The electronic device of claim 1, wherein the plurality of operations further comprising:
receiving correction data of the first region from the second external electronic device via the communication circuit;
merging the correction data of the first region and the first raw image data, thereby resulting in a corrected first raw image data; and
displaying the corrected first raw image data on the display.

5. The electronic device of claim 1, wherein the first external electronic device is an edge server, and
wherein the second external electronic device is a server.

6. The electronic device of claim 1, further comprising:
a camera,
wherein the plurality of operations further comprising:
storing second raw image data in the memory;
generating second small raw image data smaller in size than the second raw image data, from the second raw image data;
transmitting the second small raw image data to the first external electronic device via the communication circuit;
receiving object identification information for identifying at least one object of the second small raw image data from the first external electronic device via the communication circuit;
displaying second display image data via the display based on the object identification information; and
obtaining, by a user, the first raw image data through the camera.

7. The electronic device of claim 6, wherein the plurality of operations further comprising:
when information indicating failure of identification of the at least one object is included in the object identification information, converting an attribute of an icon display of the second display image data.

8. An image processing method of an electronic device, the method comprising:
storing first raw image data in a memory;
generating first small raw image data smaller in size than the first raw image data, from the first raw image data;
transmitting the first small raw image data to a first external electronic device;
receiving information about an object region for identifying at least one object of the first small raw image data from the first external electronic device;
transmitting a first region of the first raw image data to a second external electronic device based on a user input and the information about the object region; and
displaying first display image data corresponding to the information about the object region via a display,
wherein the user input is associated with selection of the object region.

9. The method of claim 8, wherein the first display image data includes at least one of a category or a name of the identified at least one object.

10. The method of claim 8, wherein the generating of the first small raw image data includes:
performing at least one of down scaling, down sampling, or compression on the first raw image data.

11. The method of claim 8, further comprising:
receiving correction data of the first region from the second external electronic device; and
merging the correction data of the first region and the first raw image data.

12. The method of claim 8, wherein the first external electronic device is an edge server, and
wherein the second external electronic device is a server.

13. The method of claim 8, further comprising:
storing second raw image data in the memory;
generating second small raw image data smaller in size than the second raw image data, from the second raw image data;
transmitting the second small raw image data to the first external electronic device;
receiving object identification information for identifying at least one object of the second small raw image data from the first external electronic device;
displaying second display image data via a display based on the object identification information; and
obtaining, by a user, the first raw image data via a camera.

14. An electronic device comprising:
a housing;
a wireless communication circuit disposed inside the housing;
a camera disposed inside the housing, exposed through a portion of the housing, and configured to generate raw image data;
a display disposed inside the housing, viewable through a portion of the housing, and configured to display an image of a first display image data generated based on the raw image data;
at least one processor operatively connected to the wireless communication circuit, the display, and the camera; and
at least one memory operatively connected to the processor and configured to store the raw image data,
wherein the memory stores instructions that, when executed, cause the processor to perform a plurality of operation comprising:
generating first small raw image data smaller in size than the raw image data based on the raw image data;
transmitting the first small raw image data to a server locally connected to a base station, using the wireless communication circuit;
receiving first image data, which is generated based on the first small raw image data by the server and includes meta data associated with object recognition within the first small raw image data, using the wireless communication circuit;
generating second display image data, using the first display image data and the first image data; and
displaying an image of the second display image data on the display.

15. The electronic device of claim 14, wherein the first small raw image data further includes at least one of time, a location, a place, illuminance, or weather.

16. The electronic device of claim 14, wherein the plurality of operations further comprising:
receiving a user input to select a partial region of the image of the first display image data displayed on the display; and generating the first small raw image data based at least partly on the user input.

17. The electronic device of claim 14, wherein the plurality of operations further comprising:
- receiving a user input to select a partial region of the image of the second display image data displayed on the display;
- generate second small raw image data to transmit the second small raw image data to an external server, based at least partly on the user input;
- receive second image data generated by correcting image quality of the second small raw image data by the external server;
- generate third display image data, using the raw image data and the second image data; and
- display an image of the third display image data on the display.

* * * * *